(12) United States Patent
Kim et al.

(10) Patent No.: US 10,088,977 B2
(45) Date of Patent: Oct. 2, 2018

(54) ELECTRONIC DEVICE AND METHOD FOR PROVIDING CONTENT ACCORDING TO FIELD ATTRIBUTE

(71) Applicant: Samsung Electronics Co., Ltd., Gyeonggi-do (KR)

(72) Inventors: Tae-Yeon Kim, Seoul (KR); Sang-Hyuk Koh, Jeju-do (KR); Hee-Jin Kim, Seoul (KR); Bo-Hyun Sim, Incheon (KR); Hye-Mi Lee, Incheon (KR); Si-Hak Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 429 days.

(21) Appl. No.: 14/475,194

(22) Filed: Sep. 2, 2014

(65) Prior Publication Data
US 2015/0067504 A1 Mar. 5, 2015

(30) Foreign Application Priority Data

Aug. 30, 2013 (KR) .................. 10-2013-0104302

(51) Int. Cl.
*G06F 3/0482* (2013.01)
*G06F 9/44* (2018.01)
(Continued)

(52) U.S. Cl.
CPC .......... *G06F 3/0482* (2013.01); *G06F 3/0485* (2013.01); *G06F 3/04883* (2013.01); *G06F 9/453* (2018.02); *G06F 17/243* (2013.01)

(58) Field of Classification Search
CPC .. G06F 3/0482; G06F 3/0485; G06F 3/04883; G06F 17/2264
(Continued)

(56) References Cited

U.S. PATENT DOCUMENTS 5,267,327 A * 11/1993 Hirayama .......... G06K 9/00436
382/161
5,347,295 A 9/1994 Agulnick et al.
(Continued)

FOREIGN PATENT DOCUMENTS

CN 1375081 10/2002
CN 101149799 3/2008
(Continued)

OTHER PUBLICATIONS

Japanese Office Action dated Sep. 8, 2015 issued in counterpart application No. 2014-145482, 9 pages.
(Continued)

*Primary Examiner* — Daeho D Song
(74) *Attorney, Agent, or Firm* — The Farrell Law Firm, P.C.

(57) ABSTRACT

An operating method of an electronic device is provided. The method includes selecting an area corresponding to at least one field of a page displayed through a display of the electronic device on the basis of an input; confirming an attribute corresponding to the at least one field among a plurality of attributes including a first attribute and a second attribute; and selectively providing a content corresponding to the attribute among at least one content including a first content and a second content according to the confirmed attribute.

20 Claims, 28 Drawing Sheets

(51) Int. Cl.
  *G06F 3/0485* (2013.01)
  *G06F 17/24* (2006.01)
  *G06F 3/0488* (2013.01)
  *G06F 9/451* (2018.01)

(58) Field of Classification Search
  USPC .............................................. 715/708, 780
  See application file for complete search history.

(56) References Cited

U.S. PATENT DOCUMENTS

| | | | | |
|---|---|---|---|---|
| 5,699,455 | A * | 12/1997 | Arai | G06K 9/6255 |
| | | | | 382/187 |
| 6,295,372 | B1 * | 9/2001 | Hawkins | G06F 3/04883 |
| | | | | 345/156 |
| 7,164,410 | B2 | 1/2007 | Kupka | |
| 7,479,949 | B2 | 1/2009 | Jobs et al. | |
| 7,783,983 | B1 | 8/2010 | Mayers et al. | |
| 7,958,143 | B1 * | 6/2011 | Amacker | G06F 17/30873 |
| | | | | 707/736 |
| 8,487,879 | B2 * | 7/2013 | Kim | G06F 3/04883 |
| | | | | 345/173 |
| 8,495,508 | B2 * | 7/2013 | Lebrun | G06Q 30/02 |
| | | | | 715/758 |
| 8,601,079 | B2 * | 12/2013 | Rajamanthiram | H04L 51/08 |
| | | | | 709/206 |
| 8,745,528 | B2 * | 6/2014 | Feldman | G06F 3/04883 |
| | | | | 715/804 |
| 8,751,967 | B2 * | 6/2014 | Vuong | G06F 17/30126 |
| | | | | 715/752 |
| 8,924,883 | B2 * | 12/2014 | Eischeid | G06F 3/0481 |
| | | | | 715/781 |
| 9,201,592 | B2 * | 12/2015 | Akhavan Fomani et al. | |
| | | | | G06F 3/0237 |
| 9,473,730 | B1 * | 10/2016 | Roy | H04H 60/44 |
| 2003/0038788 | A1 * | 2/2003 | Demartines | G06F 3/0485 |
| | | | | 345/173 |
| 2003/0214531 | A1 * | 11/2003 | Chambers | G06F 3/04883 |
| | | | | 715/764 |
| 2004/0126017 | A1 * | 7/2004 | Seni | G06K 9/2054 |
| | | | | 382/229 |
| 2004/0128353 | A1 * | 7/2004 | Goodman | H04L 12/581 |
| | | | | 709/204 |
| 2004/0205525 | A1 | 10/2004 | Murren et al. | |
| 2005/0182667 | A1 | 8/2005 | Metzger et al. | |
| 2005/0192966 | A1 * | 9/2005 | Hilbert | G06F 17/30067 |
| 2005/0203806 | A1 * | 9/2005 | Jacobs | G06Q 30/0619 |
| | | | | 705/26.44 |
| 2005/0237311 | A1 * | 10/2005 | Nakajima | G06F 3/04883 |
| | | | | 345/173 |
| 2006/0071910 | A1 | 4/2006 | Kim et al. | |
| 2006/0209040 | A1 | 9/2006 | Garside et al. | |
| 2007/0005707 | A1 * | 1/2007 | Teodosiu | G06Q 10/107 |
| | | | | 709/206 |
| 2007/0130500 | A1 * | 6/2007 | Rivers-Moore | H04L 67/2823 |
| | | | | 715/205 |
| 2007/0130502 | A1 | 6/2007 | Tolgu et al. | |
| 2007/0233875 | A1 * | 10/2007 | Raghav | G06Q 10/107 |
| | | | | 709/227 |
| 2007/0271340 | A1 * | 11/2007 | Goodman | G06Q 10/107 |
| | | | | 709/206 |
| 2008/0025613 | A1 | 1/2008 | Kumar et al. | |
| 2008/0051063 | A1 * | 2/2008 | Hisamitsu | H04M 1/72555 |
| | | | | 455/412.1 |
| 2008/0267505 | A1 | 10/2008 | Dabet et al. | |
| 2009/0043799 | A1 * | 2/2009 | Morris | G06F 9/453 |
| 2009/0116744 | A1 * | 5/2009 | Woo | G06K 9/222 |
| | | | | 382/187 |
| 2009/0198782 | A1 * | 8/2009 | Chang | G06Q 10/107 |
| | | | | 709/206 |
| 2009/0249235 | A1 * | 10/2009 | Kim | G06F 3/0481 |
| | | | | 715/765 |
| 2009/0256808 | A1 * | 10/2009 | Kun | G06K 9/00422 |
| | | | | 345/173 |
| 2010/0057648 | A1 | 3/2010 | Dai et al. | |
| 2010/0318743 | A1 * | 12/2010 | Fitzpatrick | G06F 9/454 |
| | | | | 711/126 |
| 2011/0041177 | A1 * | 2/2011 | Pereira | G06F 3/0482 |
| | | | | 726/20 |
| 2011/0074710 | A1 * | 3/2011 | Weeldreyer | G06F 3/0481 |
| | | | | 345/173 |
| 2011/0107227 | A1 | 5/2011 | Rempell et al. | |
| 2011/0126226 | A1 * | 5/2011 | Makhlouf | H04N 7/17336 |
| | | | | 725/32 |
| 2011/0185314 | A1 * | 7/2011 | Sahai | G06F 3/0481 |
| | | | | 715/838 |
| 2011/0314376 | A1 * | 12/2011 | Dearman | G06F 9/453 |
| | | | | 715/711 |
| 2012/0011449 | A1 * | 1/2012 | Sasson | H04L 51/08 |
| | | | | 715/752 |
| 2012/0060147 | A1 | 3/2012 | Hong et al. | |
| 2012/0096354 | A1 | 4/2012 | Park et al. | |
| 2012/0120021 | A1 | 5/2012 | Konishi et al. | |
| 2012/0173633 | A1 * | 7/2012 | Balabhadrapatruni | |
| | | | | G06Q 10/107 |
| | | | | 709/206 |
| 2012/0216140 | A1 * | 8/2012 | Smith | G06F 3/0481 |
| | | | | 715/780 |
| 2012/0216141 | A1 * | 8/2012 | Li | G06F 3/04883 |
| | | | | 715/780 |
| 2012/0223935 | A1 * | 9/2012 | Renwick | G06F 3/0488 |
| | | | | 345/419 |
| 2012/0278406 | A1 * | 11/2012 | Meisels | H04L 51/08 |
| | | | | 709/206 |
| 2012/0324395 | A1 * | 12/2012 | Cohen | G06F 17/30643 |
| | | | | 715/780 |
| 2013/0014285 | A1 * | 1/2013 | Sasakura | G06Q 50/01 |
| | | | | 726/29 |
| 2013/0050141 | A1 | 2/2013 | Park et al. | |
| 2013/0091443 | A1 | 4/2013 | Park et al. | |
| 2013/0097037 | A1 * | 4/2013 | Gospodarek | G06Q 30/0643 |
| | | | | 705/21 |
| 2013/0097562 | A1 * | 4/2013 | Kermoian | H04M 1/72597 |
| | | | | 715/841 |
| 2013/0125052 | A1 * | 5/2013 | Baird | G06F 3/0482 |
| | | | | 715/810 |
| 2013/0174132 | A1 | 7/2013 | Fenicle et al. | |
| 2013/0205189 | A1 * | 8/2013 | DiPierro | G06F 3/0483 |
| | | | | 715/224 |
| 2013/0326398 | A1 * | 12/2013 | Zuverink | G06F 3/048 |
| | | | | 715/784 |
| 2014/0195928 | A1 * | 7/2014 | Carlen | G06F 3/0484 |
| | | | | 715/752 |
| 2014/0258003 | A1 * | 9/2014 | Celis | G06Q 30/0277 |
| | | | | 705/14.73 |
| 2014/0334732 | A1 | 11/2014 | Jung et al. | |
| 2015/0139550 | A1 * | 5/2015 | Kuno | G06K 9/03 |
| | | | | 382/189 |
| 2016/0139691 | A1 * | 5/2016 | Li | G06F 3/03545 |
| | | | | 345/179 |

FOREIGN PATENT DOCUMENTS

| | | |
|---|---|---|
| CN | 101266533 | 9/2008 |
| CN | 101286093 | 10/2008 |
| CN | 102945137 | 2/2013 |
| EP | 2 821 908 | 1/2015 |
| JP | 1-261720 | 10/1989 |
| JP | 8-235119 | 9/1996 |
| JP | 2000-010691 | 1/2000 |
| JP | 2002-278683 | 9/2002 |
| JP | 2003-296029 | 10/2003 |
| JP | 2009-070189 | 4/2009 |
| JP | 2010-020658 | 1/2010 |
| JP | 2010-128666 | 6/2010 |
| JP | 2011-022961 | 2/2011 |
| JP | 2013-054745 | 3/2013 |
| JP | 2013-161167 | 8/2013 |
| RU | 2 413 970 | 3/2011 |

(56) References Cited

FOREIGN PATENT DOCUMENTS

| WO | WO 92/08183 | 5/1992 |
|----|----|----|
| WO | WO 2008/121930 | 10/2008 |
| WO | WO 2012/077876 | 6/2012 |

OTHER PUBLICATIONS

European Search Report dated Mar. 18, 2015 issued in counterpart application No. 14182322.9-1972.
Australian Examination Report dated Jun. 9, 2015 issued in counterpart application No. 2014216029, 5 pages.
Taiwanese Search Report dated Jul. 27, 2015 issued in counterpart application No. 10420986280, 7 pages.
Japanese Office Action dated Mar. 29, 2016 issued in counterpart application No. 2014-145482, 6 pages.
Australian Notice of Acceptance dated Apr. 1, 2016 issued in counterpart application No. 2014216029, 3 pages.
European Search Report dated May 18, 2016 issued in counterpart application No. 14182322.9-1972, 8 pages.
European Search Report dated Sep. 15, 2015 issued in counterpart application No. 14182322.9-1972, 9 pages.
International Search Report dated Nov. 25, 2014 issued in counterpart application No. PCT/KR2014/007470.
Chinese Office Action dated Jun. 1, 2017 issued in counterpart application No. 201410440374.5, 12 pages.
Russian Office Action dated May 29, 2017 issued in counterpart application No. 2016106644/08, 14 pages.
Alan Cooper et al., "About Face 3—The Essentials of interaction Design", Jul. 23, 2008, 11 pages.
Japanese Office Action dated Dec. 19, 2017 issued in counterpart application No. 2016-149939, 12 pages.

\* cited by examiner

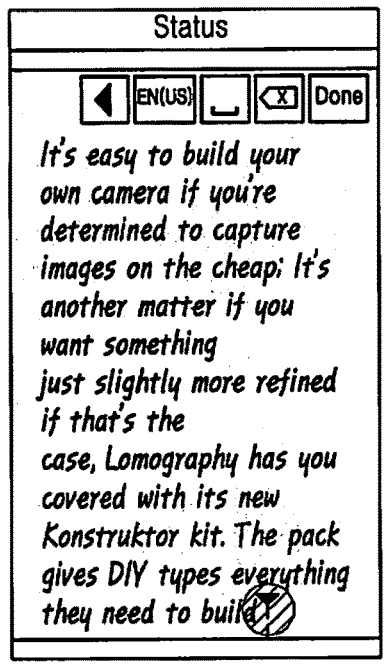 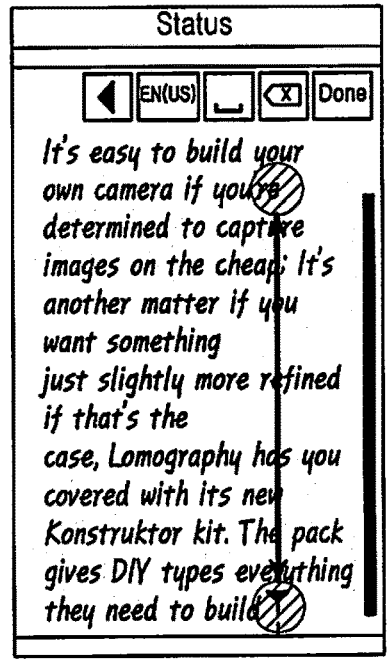
FIG.13A    FIG.13B
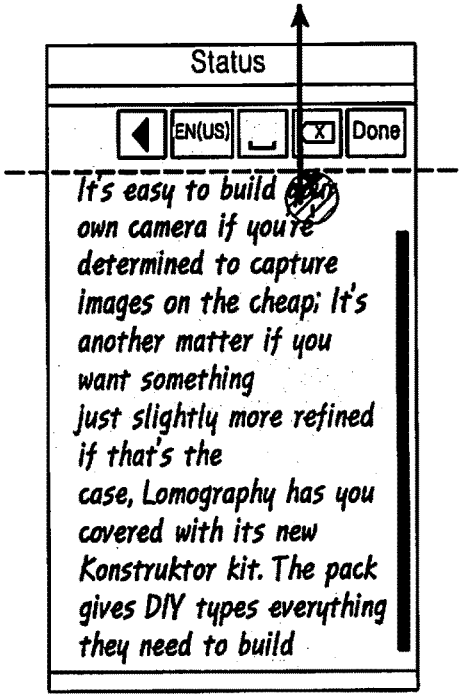 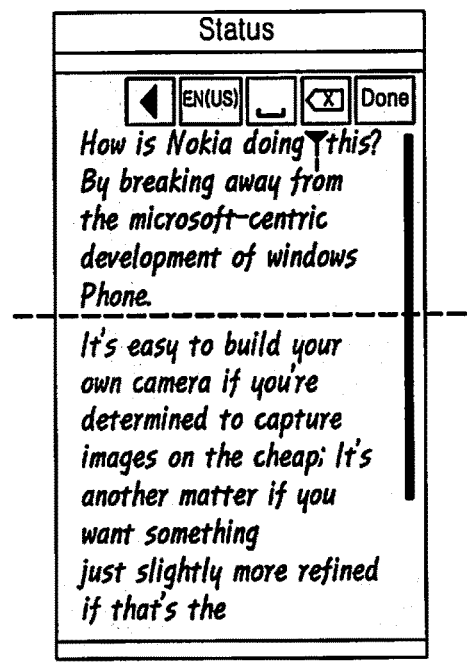
FIG.13C    FIG.13D

ELECTRONIC DEVICE AND METHOD FOR PROVIDING CONTENT ACCORDING TO FIELD ATTRIBUTE

PRIORITY

This application claims priority under 35 U.S.C. § 119 to an application filed in the Korean Intellectual Property Office on Aug. 30, 2013 and assigned Serial No. 10-2013-0104302, the contents of which are incorporated herein by reference.

BACKGROUND OF THE INVENTION

1. Field of the Invention

The present invention relates generally to an electronic device and a method for providing content according to a field attribute.

2. Description of the Related Art

As functions of electronic devices develop, a content that a user wants is inputted conveniently by using an input tool. For example, a user may make an input by using hovering function in addition to a simple touch input.

However, since a conventional electronic device cannot provide each differentiated content, the user's interactions are increased.

Accordingly, the development of a device and method for providing various contents to a user by distinguishing the field attribute of a selected area and an inputted interaction in an electronic device is needed.

SUMMARY OF THE INVENTION

An aspect of the present invention is to substantially solve at least the above problems and/or disadvantages and to provide at least the advantages below. Accordingly, an aspect of the present invention is to provide a device and method for improving the user's convenience by providing each differentiated content by distinguishing the field attribute of a selected area and an inputted interaction.

Another aspect of the present invention is to provide a device and method for reducing the user's interactions by auto-scrolling a screen of an input field area in a set direction when content is inputted to a set visual guide area.

According to an aspect of the present invention, an operating method of an electronic device includes selecting an area corresponding to at least one field of a page displayed through a display of the electronic device on the basis of an input; confirming an attribute corresponding to the at least one field among a plurality of attributes including a first attribute and a second attribute; and selectively providing a content corresponding to the attribute among at least one content including a first content and a second content according to the confirmed attribute.

According to another aspect of the present invention, an electronic device includes a display unit selecting an area corresponding to at least one field of a page displayed through a display of the electronic device on the basis of an input; and a processor confirming an attribute corresponding to the at least one field among a plurality of attributes including a first attribute and a second attribute and selectively providing a content corresponding to the attribute among at least one content including a first content and a second content according to the confirmed attribute.

According to another aspect of the present invention, provided is a non-transitory computer readable recording medium having a program thereon for executing a method of selecting an area corresponding to at least one field of a page displayed through a display of an electronic device on the basis of an input, confirming an attribute corresponding to the at least one field among a plurality of attributes including a first attribute and a second attribute, and selectively providing a content corresponding to the attribute among at least one content including a first content and a second content according to the confirmed attribute.

BRIEF DESCRIPTION OF THE DRAWINGS

The above and other aspects, features and advantages of the present invention will become more apparent from the following detailed description when taken in conjunction with the accompanying drawings in which:

FIGS. 13A, 13B, 13C and 13D are views illustrating an extended concept of an input field area in an electronic device according to another embodiment of the present invention;

DETAILED DESCRIPTION OF EMBODIMENTS OF THE PRESENT INVENTION

Figure 1:
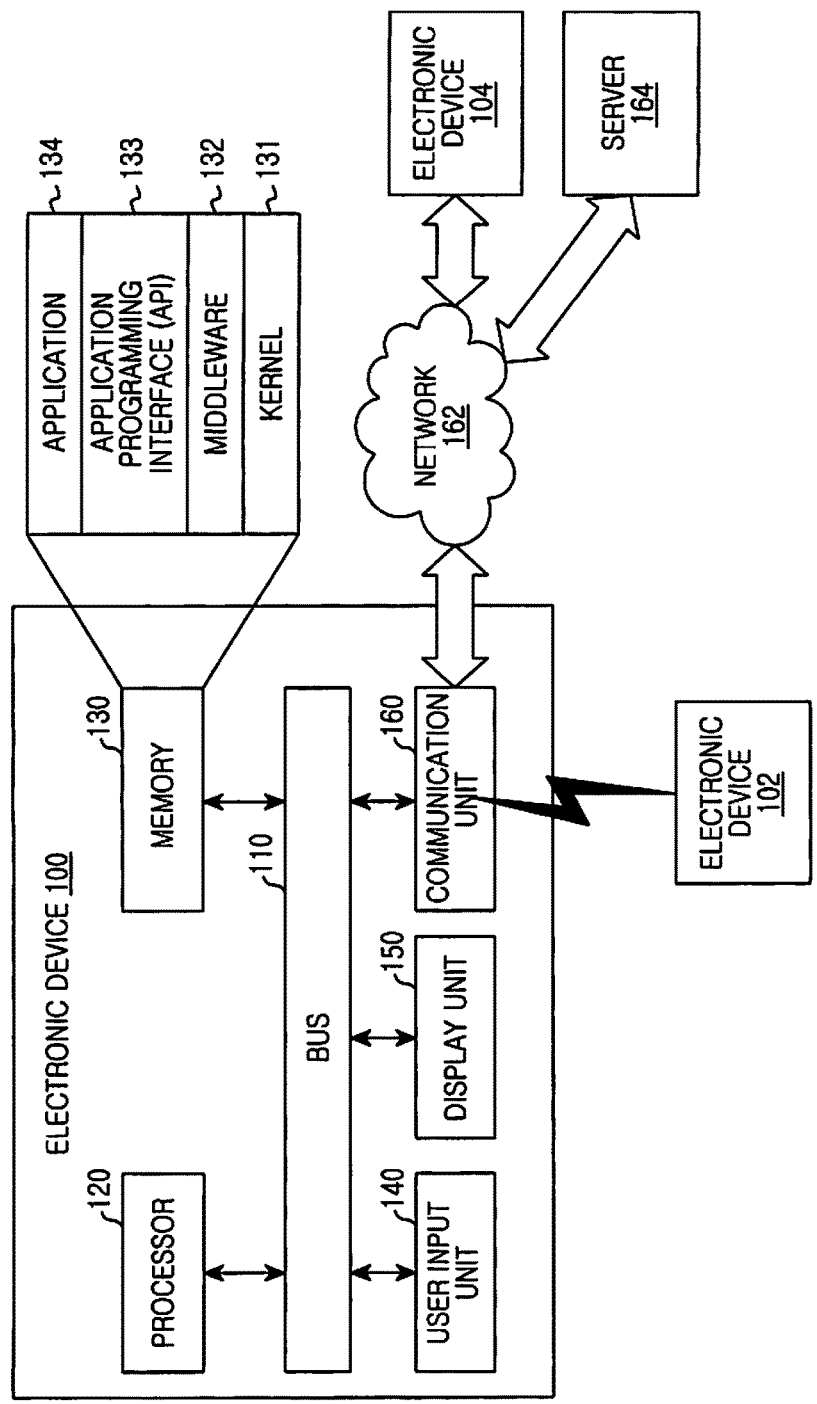
FIG. 1 is a block diagram illustrating an electronic device according to an embodiment of the present invention.

Hereinafter, embodiments of the present invention will be described in more detail with reference to the accompanying drawings. In relation to the present invention, specific embodiments are illustrated in the drawings with related detailed descriptions. Various modifications are possible, and thus various embodiments are provided. Accordingly, the present invention is not intended to be limited to the specific embodiments, and it is understood that it should include all modifications, equivalents, and substitutes within the scope and technical range of the present invention. With respect to the descriptions of the drawings, like reference numerals refer to like elements.

An electronic device according to an embodiment of the present invention may be a device having a communication function. For example, the electronic device may be at least one or a combination of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a smart white appliance (for example, a refrigerator, an air conditioner, a vacuum cleaner, an artificial intelligence robot, a TV, a Digital Video Disk (DVD) player, an audio system, an oven, a microwave, a washing machine, an air purifier, and a digital photo frame), various medical devices (for example, Magnetic Resonance Angiography (MRA), Magnetic Resonance Imaging (MRI), Computed Tomography (CT), tomography, and ultrasonograph), a navigation device, a Global Positioning System (GPS) receiver, an Event Data Recorder (EDR), a Flight Data Recorder (FDR), a set-top box, a TV box (for example, Samsung HomeSync™, Apple TV™, or a Google TV™), an electronic dictionary, a vehicle infotainment device, electronic equipment for a ship (for example, a navigation device for a ship and a gyro compass), avionics, a security device, an electronic garment, an electronic key, a camcorder, a game console, a Head-Mounted Display (HMD), a flat panel display device, an electronic album, a part of a furniture or building/structure including a communication function, an electronic board, an electronic signature receiving device, and a projector. It is apparent to those skilled in the art that the electronic device is not limited to the above-mentioned devices.

FIG. 1 is a block diagram illustrating an electronic device according to various embodiments of the present invention. Referring to FIG. 1, the electronic device 100 includes a bus 110, a processor 120, a memory 130, a user input unit 140, a display unit 150, and a communication unit 160.

The bus is a circuit connecting the above-mentioned components to each other and delivering a communication (for example, a control message) therebetween.

The processor 120 receives a command from the other components (for example, the memory 130, the user input unit 140, the display unit 150, and the communication unit 160) through the bus 110, interprets the received command, and performs operations and data processing in response to the interpreted command.

The memory 130 stores commands or data received from or generated by the processor 120 or the above other components. The memory 130 may include programming units, for example, a kernel 131, a middleware 132, an application programming interface (API) 133, and an application 134. Each of the above-mentioned programming units may be configured with software, firmware, hardware, or a combination thereof.

The kernel 131 controls or manages system resources (for example, the bus 110, the processor 120, or the memory 130) used for performing operations or functions implemented by the remaining other programming units, for example, the middleware 132, the API 133, or the application 134. Additionally, the kernel 131 may provide an interface for accessing an individual component of the electronic device 100 from the kernel 131, the middleware 132, the API 133, or the application 134 and controlling or managing it.

The middleware 132 serves as an intermediary role for exchanging data between the API 133 or the application 134 and the kernel 131 through communication. Additionally, in relation to job requests received from a plurality of applications 134, the middleware 132 may perform a load balancing on the job requests by using a method of assigning a priority for using a system resource (for example, the bus 110, the processor 120, or the memory 130) to at least one application among the plurality of applications 134.

The API 133, as an interface through which the application 134 controls a function provided from the kernel 131 or the middleware 132, includes at least one interface or function for file control, window control, image processing, or character control.

The user input unit 140 receives commands or data from a user and delivers them to the processor 120 or the memory 130 via the bus 110. The display unit 150 displays images, video, or data to a user.

The communication unit 160 connects a communication between another electronic device 102 and the electronic device 100. The communication unit 160 may support a predetermined short range communication protocol (for example, Wireless Fidelity (WiFi), Bluetooth (BT), Near Field Communication (NFC)) or a predetermined network communication 162 (for example, Internet, Local Area Network (LAN), Wide Area Network (WAN), telecommunication network, cellular network, satellite network or plain old telephone service (POTS)). Each of the electronic devices 102 and 104 may be identical to or different from the electronic device 100.

Figure 2:
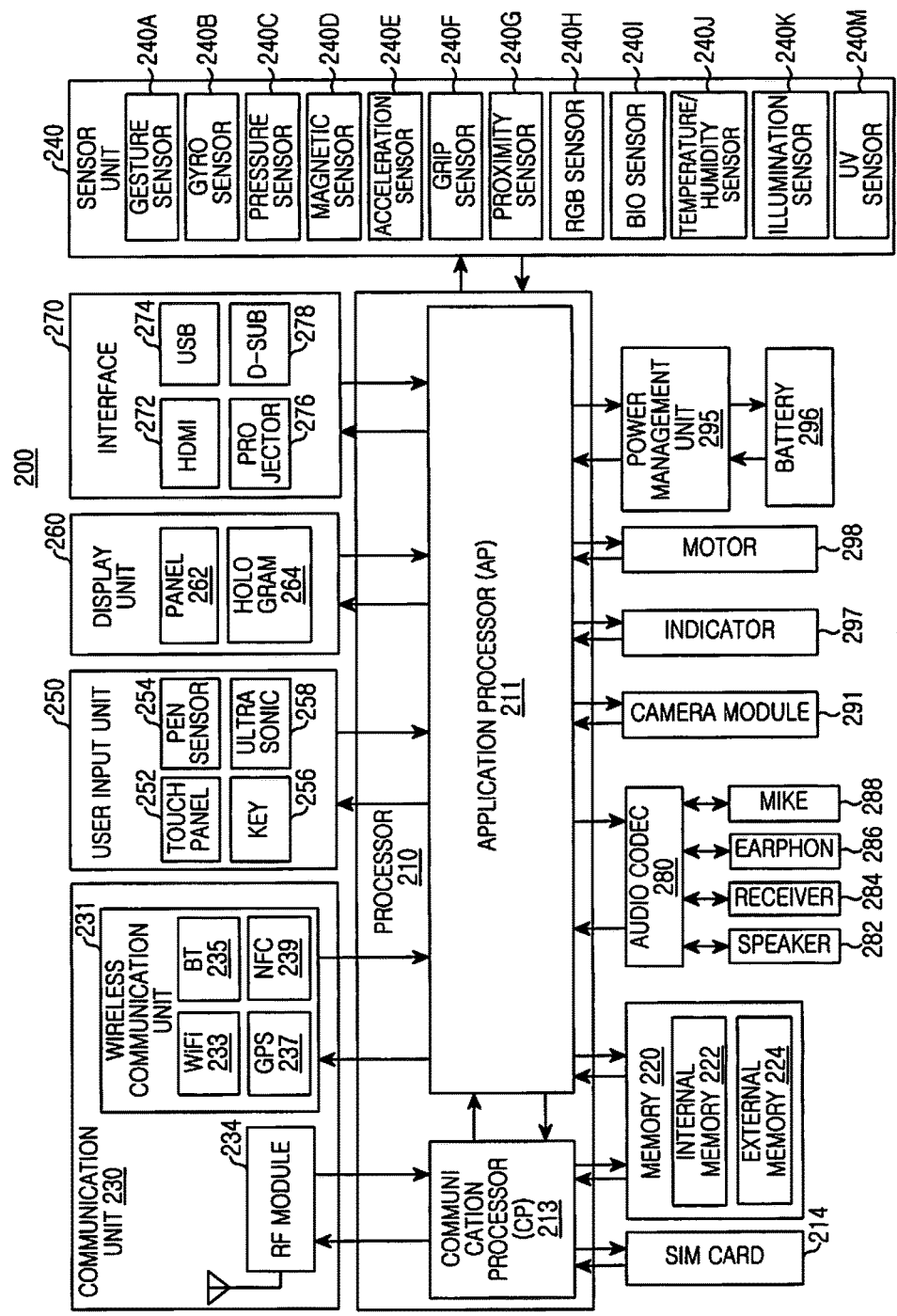
FIG. 2 is a block diagram of hardware according to an embodiment of the present invention.

FIG. 2 is a block diagram of the hardware 200 according to various embodiments of the present invention. The hardware 200 may be the electronic device 100 shown in FIG. 1, for example. Referring to FIG. 2, the hardware 200 includes at least one processor 210, a Subscriber Identification Module (SIM) card 214, a memory 220, a communication unit 230, a sensor unit 240, a user input unit 250, a display unit 260, an interface 270, an audio codec 280, a camera module 291, a power management unit 295, a battery 296, an indicator 297, and a motor 298.

The processor 210 includes at least one Application Processor (AP) 211 and at least one Communication Processor (CP) 213, and may be the processor 120 shown in FIG. 1. Although the AP 211 and the CP 213 included in the processor 210 are shown in FIG. 2, they may be included in different IC packages, or in one IC package. The processor 210 confirms an attribute corresponding to at least one field among a plurality of attributes including a first attribute and a second attribute and selectively provides a content corresponding to an attribute among at least one content including a first content and a second content according to the confirmed attribute. Additionally, the processor 210 may confirm at least one interaction relating to an input among a plurality of specified interactions. When at least one interaction is a first specified interaction, the processor 210 performs a first function in relation to the corresponding content and when at least one interaction is a second specified interaction, performs a second function in relation to the corresponding content. Additionally, based on the attribute, the processor 210 may confirm a corresponding field among a plurality of fields including at least one of a first field for receiving a content from the outside of an electronic device, a second field for receiving a content stored in an electronic device, and a third field for receiving a specified menu. Additionally, the processor 210 may auto-scroll a screen of an input field area according to the amount of content displayed on a visual guide area. Additionally, when an attribute corresponds to a third attribute and an input corresponds to a first interaction among a plurality of specified interactions, the processor 210 may enlarge or reduce the size of a content including an area. Additionally, the processor may perform an edit function corresponding to at least one menu selected from an edit menu.

The AP 211 controls a plurality of hardware or software components connected to the AP 211 by executing an operating system or an application program and performs various data processing and operations with multimedia data. The AP 211 may be implemented with a System on Chip (SoC), for example. According to an embodiment of the present invention, the processor 210 may further include a Graphic Processing Unit (GPU) (not shown).

The CP 213 manages a data link in a communication between an electronic device (for example, the electronic device 100) including the hardware 200 and other electronic devices connected via a network and converts a communication protocol. The CP 213 may be implemented with an SoC, for example. According to an embodiment of the present invention, the CP 213 performs at least part of a multimedia control function. The CP 213 may perform a distinction and authentication of a terminal in a communication network by using a subscriber identification unit (for example, the SIM card 214). Additionally, the CP 213 may provide services, for example, a voice call, a video call, a text message, or packet data, to a user.

Additionally, the CP 213 controls data transmission of the communication unit 230. As shown in FIG. 2, components such as the CP 213, the power management unit 295, and the memory 220 are separated from the AP 211, but according to an embodiment of the present invention, the AP 211 may be implemented including some of the above-mentioned components (for example, the CP 213).

According to an embodiment of the present invention, the AP 211 or the CP 213 may load commands or data, which are received from a nonvolatile memory or at least one of other components connected thereto, into a volatile memory and may process them. Furthermore, the AP 211 or the CP 213 may store data received from or generated by at least one of other components in a nonvolatile memory.

The SIM card 214 includes unique identification information (for example, an Integrated Circuit Card IDentifier (ICCID)) or subscriber information (for example, an International Mobile Subscriber Identity (IMSIThe memory 220 includes an internal memory 222 and an external memory 224, and may be the memory 130 shown in FIG. 1. The internal memory 222 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory). According to an embodiment of the present invention, the internal memory 222 may have a form of Solid State Drive (SSD). The external memory 224 may further include a compact flash (CF), a secure digital (SD), a micro secure digital (Micro-SD), a mini secure digital (Mini-SD), an extreme digital (xD), or a memory stick unit. The communication unit 230 includes a wireless communication unit 231 or an RF module 234, and may be the communication unit 160 shown in FIG. 1. The wireless communication unit 231 includes a WiFi 233, Bluetooth (BT) 235, a GPS 237, or a Near Field Communication (NFC) 239 unit. For example, the wireless communication unit 231 provides a wireless communication function by using a wireless frequency. Additionally or alternatively, the wireless communication unit 231 may include a network interface (for example, a LAN card) or a modem for connecting the hardware 200 to a network (for example, Internet, local area network (LAN), wire area network (WAN), telecommunication network, cellular network, satellite network, or plain old telephone service (POTS)).

The RF unit 234 may be responsible for data transmission, for example, the transmission of an RF signal or a called electrical signal. The RF unit 234 may include a transceiver, a power amp module (PAM), a frequency filter, or a low noise amplifier (LNA). The RF unit 234 may also include components for transmitting/receiving electromagnetic waves on free space in a wireless communication, for example, conductors or conducting wires.

The sensor unit 240 includes at least one of a gesture sensor 240A, a gyro sensor 240B, a pressure sensor 240C, a magnetic sensor 240D, an acceleration sensor 240E, a grip sensor 240F, a proximity sensor 240G, a red, green, blue (RGB) sensor 240H, a bio sensor 240I, a temperature/humidity sensor 240J, an illumination sensor 240K, and a ultra violet (UV) sensor 240M. The sensor unit 240 measures physical quantities or detects an operating state of an electronic device, thereby converting the measured or detected information into electrical signals. Additionally/alternately, the sensor unit 240 may include an E-nose sensor, an electromyography (EMG) sensor, an electroencephalogram (EEG) sensor, or an electrocardiogram (ECG) sensor. The sensor unit 240 may further include a control circuit for controlling at least one sensor therein The user input unit 250 includes a touch panel 252, a (digital) pen sensor 254, a key 256, or an ultrasonic input device 258, and may be the user input unit 140 shown in FIG. 1. The touch panel 252 recognizes a touch input through at least one of a capacitive, resistive, infrared, or ultrasonic method, for example. The touch panel 252 may further include a controller. In the case of the capacitive method, both direct touch and proximity recognition are possible. The touch panel 252 may further include a tactile layer, which provides a tactile response to a user. The (digital) pen sensor 254 may be implemented through a method similar or identical to that of receiving a user's touch input or an additional sheet for recognition. As the key 256, a keypad or a touch key may be used, for example. The ultrasonic input device 258 is a device confirming data by detecting sound waves through a mike (for example, the mike 288) in a terminal, and provides wireless recognition through a pen generating ultrasonic signals. According to an embodiment of the present invention, the hardware 200 may receive a user input from an external device (for example, a network, a computer, or a server) connected to the hardware 200 through the communication unit 230 The display unit 260 includes a panel 262 or a hologram 264, and may be the display unit 150 shown in FIG. 1. The panel 262 may include a Liquid-Crystal Display (LCD) or an Active-Matrix Organic Light-Emitting Diode (AM-OLED) display unit. The panel 262 may be implemented to be flexible, transparent, or wearable, for example. The panel 262 and the touch panel 252 may be configured with one unit. The hologram 264 may show three-dimensional images in the air by using the interference of light. According to an embodiment of the present invention, the display unit 260 may further include a control circuit to control the panel 262 or the hologram 264.

The display unit 260 selects an area corresponding to at least one field of a page displayed through a display of an electronic device on the basis of an input and may receive the input from an external device with respect to an electronic device or a user. Additionally, when an attribute corresponds to a first attribute and an input corresponds to a first specified interaction among a plurality of specified interactions, the display unit 260 provides a user interface for receiving content from the outside of the electronic device on a portion of a display, receives a content from the outside of the electronic device through the user interface, and displays a content inputted through the user interface on at least one field. Additionally, when an attribute corresponds to a first attribute and an input corresponds to a second specified interaction among a plurality of specified interactions, the display unit 260 displays an input field area for receiving content on at least one field and a result field area for displaying a content inputted to the input field area, displays a content inputted to the input field area on the result field area, and displays a content displayed on the result field area on an area. Additionally, the display unit 260 may display a content inputted to the input field area on a specified visual guide area. Further, when an attribute corresponds to a first attribute and an input corresponds to a third specified interaction among a plurality of specified interactions, the display unit 260 displays at least one specified content and selects at least one portion from at least one specified content to provide the at least one portion on an area. Additionally, when an attribute corresponds to a second attribute and an input corresponds to a first specified interaction among a plurality of specified interactions, the display unit 260 displays at least one content on at least a certain area of the display, receives an additional input corresponding to a second interaction among a plurality of specified interactions, selects at least one portion of at least one content on the basis of the additional input, and provides the selected at least one portion on at least a certain area or another area of the display. Additionally, when an attribute corresponds to a third attribute and an input corresponds to a second specified interaction among a plurality of specified interactions, the display unit 260 displays an edit menu on at least a certain area of the display.

The interface 270 may include a High-Definition Multimedia Interface (HDMI) 272, a Universal Serial Bus (USB) 274, a projector 276, or a D-subminiature (sub) 278. Additionally or alternately, the interface 270 may include a secure Digital (SD)/multi-media card (MMC) or an infrared data association (IrDA) unit. The audio codec 280 converts voice into electrical signals and vice versa. The audio codec 280 converts voice information inputted through or outputted from a speaker 282, a receiver 284, an earphone 286, or a mike 288 According to an embodiment of the present invention, the camera unit 291 is a device for capturing an image and video, and includes at least one image sensor (for example, a front lens or a rear lens), an image signal processor (SP), or a flash LED.

The power management unit 295 manages the power of the hardware 200. Although not shown in the drawings, the power management unit 295 may include a Power Management Integrated Circuit (PMIC), a Charger Integrated Circuit (IC), or a battery fuel gauge. The PMIC may be built in an IC or SoC semiconductor, for example. A charging method may be classified as a wired method and a wireless method. The charger IC may charge a battery and may prevent overvoltage or overcurrent flow from the charger. According to an embodiment of the present invention, the charger IC may include a charger IC for at least one of the wired charging method and the wireless charging method. As the wireless charging method, for example, there is a magnetic resonance method, a magnetic induction method, or an electromagnetic method. An additional circuit for wireless charging, for example, a circuit such as a coil loop, a resonate circuit, or a rectifier circuit, may be added. A battery gauge measures the remaining amount of the battery 296, or a voltage, current, or temperature thereof during charging. The battery 296 generates electricity and supplies power. For example, the battery 296 may be a rechargeable battery. The indicator 297 displays a specific state of the hardware 200 or a part thereof (for example, the AP 211), for example, a booting state, a message state, or a charging state. The motor 298 converts electrical signals into mechanical vibration. Although not shown in the drawings, the hardware 200 may include a processing device (for example, a GPU) for mobile TV support. The processing device for mobile TV support may process media data according to the standards such as digital multimedia broadcasting (DMB), digital video broadcasting (DVB) or media flow. The names of the above-mentioned components in hardware according to an embodiment of the present invention may vary according to types of an electronic device. Hardware according to an embodiment of the present invention may be configured including at least one of the above-mentioned components or additional other components. Additionally, some components in hardware according to an embodiment of the present invention are configured as one entity, so that functions of previous corresponding components are performed identically.

Figure 3:
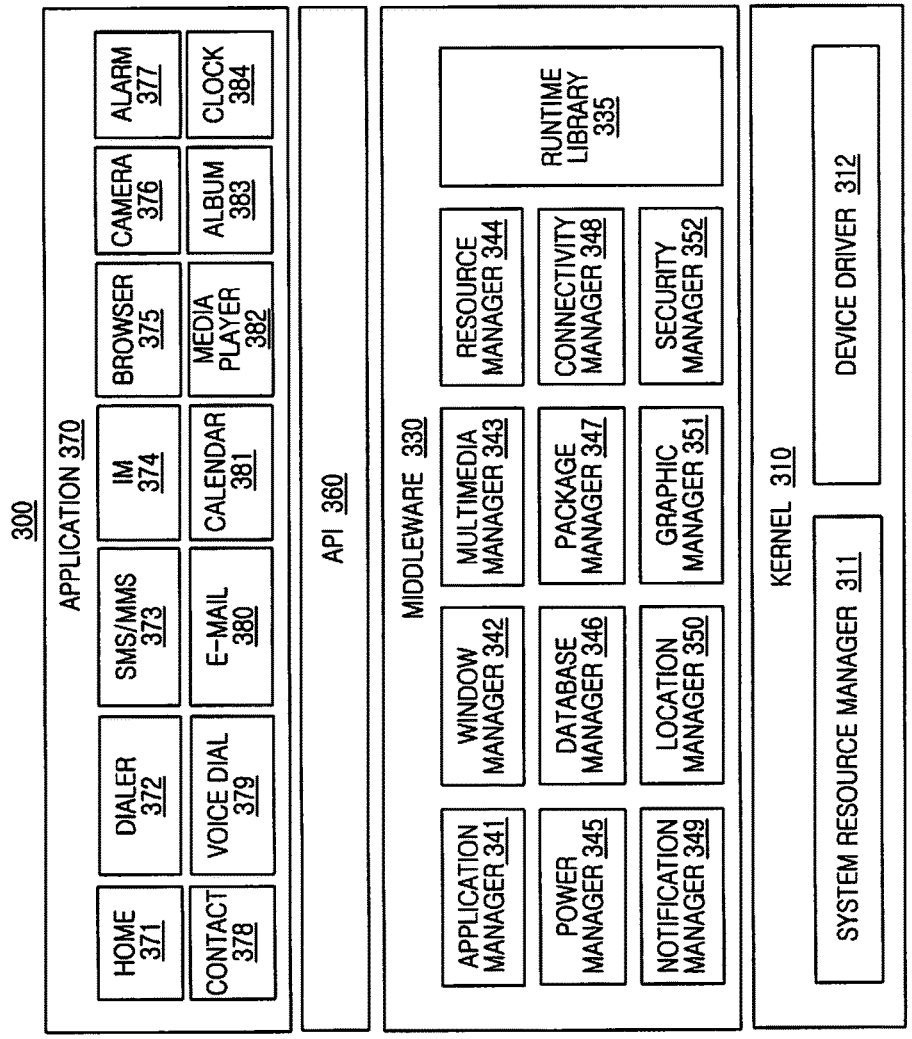
FIG. 3 is a block diagram illustrating a programming module according to an embodiment of the present invention.

FIG. 3 is a block diagram illustrating a programming unit 300 according to an embodiment of the present invention. The programming unit 300 may be included (for example, stored) in the electronic device 100 (for example, in the memory 130) of FIG. 1. At least part of the programming unit 300 may be configured with software, firmware, hardware, or a combination thereof. The programming unit 300 may include an operating system (OS) controlling a resource relating to the electronic device 100 implemented in hardware 200 or various applications (for example, the application 370) running on the OS. For example, the OS may include Android, iOS, Windows, Symbian, Tizen, or Bada. Referring to FIG. 3, the programming unit 300 includes a kernel 310, a middleware 330, an application programming interface (API) 360, and an application 370.

The kernel 310 (for example, the kernel 131) includes a system resource manager 311 and a device driver 312. The system resource manager 311 may include a process management unit, a memory management unit, or a file system management unit, for example.

The middleware 330 includes a plurality of pre-implemented units for providing functions that the application 370 commonly requires. Additionally, the middleware 330 provides functions through the API 360 to allow the application 370 to efficiently use a limited system resource in an electronic device. For example, as shown in FIG. 3, the middleware 330 (for example, the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library unit in which a compiler is used to add a new function through programming language while the application 370 is executed. According to an embodiment of the present invention, the runtime library 335 performs functions relating to an input/output, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power in operation with a basic input/output system (BIOS) and provides power information necessary for an operation. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 provides a general security function necessary for system security or user authentication. According to an embodiment of the present invention, when an electronic device (for example, the electronic device 100) has a call function, the middleware 330 may further include a telephony manager for managing a voice or video call function of the electronic device.

The middleware 330 may generate and use a new middleware unit through various function combinations of the above-mentioned internal components. The middleware 330 may provide units specified according to types of OS so as to provide distinctive functions. Additionally, the middleware 330 may delete some of existing components or add new components dynamically. Accordingly, some of components listed in an embodiment of the present invention may be omitted, other components are added, or components having different names and performing similar functions may be substituted.

The API 360 (for example, the API 133) may be provided as a set of API programming functions with a different configuration according to the OS. In the case of Android or iOS, for example, one API set may be provided by each platform, and in the case of Tizen, more than two API sets may be provided.

The application 370 (for example, the application 134), for example, may include a preloaded application or a third part application.

At least part of the programming module 300 may be implemented using a command stored in computer-readable storage media. When the command is executed by at least one processor (for example, the processor 210), the at least one processor may perform a function corresponding to the command. The computer-readable storage media may include the memory 260, for example. At least part of the programming module 300 may be implemented or executed by the processor 210. At least part of the programming module 300 may include a module, a program, a routine, sets of instructions, or a process to perform at least one function.

The names of components of a programming module 300 according to an embodiment of the present invention may vary according to the type of OS.

Figure 4A:
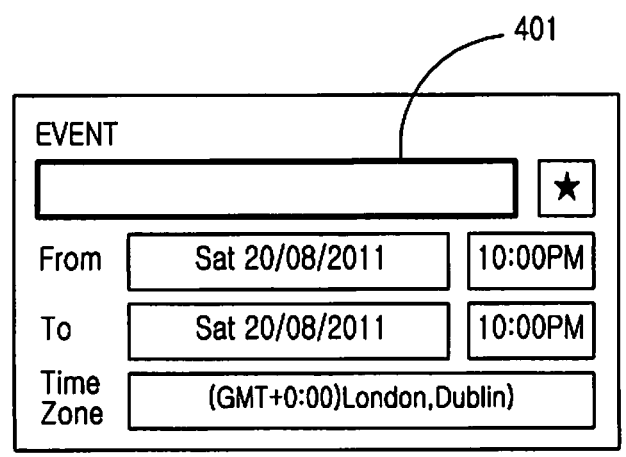
FIGS. 4A, 4B, 4C and 4D are views of providing set content by distinguishing a field attribute and an interaction of a selected area in an electronic device according to an embodiment of the present invention.

FIGS. 4A, 4B, 4C and 4D are views of providing set content by distinguishing a field attribute and an interaction of a selected area in an electronic device according to an embodiment of the present invention. First, as shown in FIG. 4A, the electronic device may select an arbitrary area 410 from an input tool. In more detail, the electronic device selects the arbitrary area 401 for receiving content from an input tool. Here, the input tool may include all tools for inputting an area to an electronic device such as a stylus pen and a user's finger.

Additionally, the electronic device may select the arbitrary area 401 through at least one interaction among a plurality of set interactions. Here, when an input tool such as a stylus pen is used as an input tool, the plurality of set interactions may be made using pen hover, pen hover and hold, pen touch, pen touch and hold, pen hover by button input, pen hover and hold by button input, pen touch by button input, and pen touch and hold function. If an input tool is a user's finger, all the functions except for the button input may be included.

Then, the electronic device determines which field among a plurality of fields corresponds to an area selected by an input tool. Here, the plurality of set fields may include an input field, a button field, and a contents field. In more detail, the input field is a field for inputting content such as text and image, the button field is a field for inputting set content, and the content field is a field for enlarging or reducing the size of a selected content to a set size or receiving a set edit menu.

If an area selected by an input tool is confirmed as an input field among a plurality of set fields, the electronic device may confirm an inputted interaction selected by the input tool.

Figure 4B:

If it is confirmed that the electronic device receives a set first interaction from an input tool as shown in FIG. 4B, the electronic device displays a visual affordance area 402 for receiving content in a selected area on a set area. In more detail, when it is confirmed that the set first interaction is selected from the input tool, the electronic device displays the visual affordance area 402 on the selected area. Then, when it is confirmed that the content input to the displayed visual affordance area 402 is completed, the electronic device displays the input-completed content on the selected area. For example, after receiving a text "meeting" from the visual affordance area 402 and then selecting an area other than the visual affordance area 402, the electronic device may confirm that a text input is completed to delete the displayed affordance area 402 and displays the inputted text "meeting" on the selected area.

The affordance area 402 may receive content from the entire area of a touch screen. Here, the affordance area 402 may be enlarged and reduced vertically as content is inputted. Additionally, if a content inputted to the affordance area 402 is too large and is inputted to the cursor maximum area, the electronic device may generate an extra area automatically at the bottom. The "cursor maximum" area refers to the capacity of the affordance area 402, and indicates that the amount of content inputted to the affordance area 402 is at is maximum amount. Additionally, if there is an already-written content in the affordance area 402, the electronic device may display an area to fit for a set size after font conversion. Moreover, when a keypad is activated, the electronic device may receive content from the affordance area 402 through the keypad.

Figure 4C:
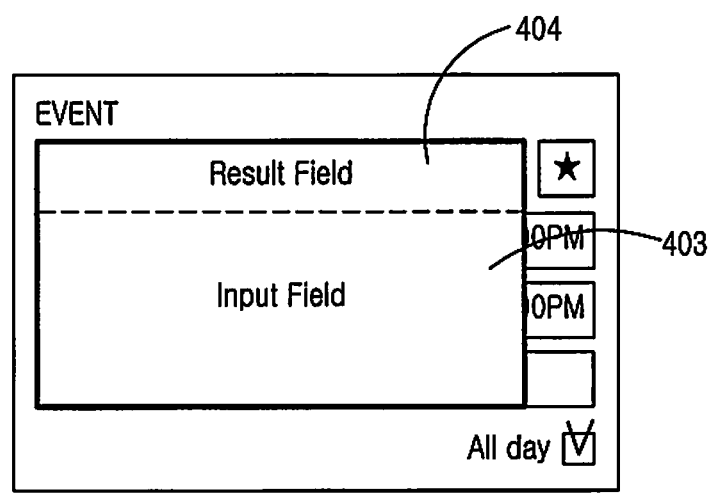

If it is confirmed that the electronic device receives a set second interaction from an input tool as shown in FIG. 4C, the electronic device displays an input field area 403 for receiving content in a selected area and a result field area 404 for displaying a content inputted to the input field area 403. Then, after it is confirmed that a content from the input field area 403 is received and a content inputted to the result field area 404 is displayed simultaneously, if the content input to the input field area 403 is completed, the electronic device displays the content displayed on the result field area 404 on a selected area.

For example, if a text "meeting" is inputted to the input field area 403, the electronic device displays the text "meeting" inputted to the input field area 403 on the result field area 404 simultaneously. Then, when it is confirmed that the content input to the input field area 403 is completed, the electronic device displays the text "meeting" displayed on the result field area 404 on a selected area.

Figure 4D:
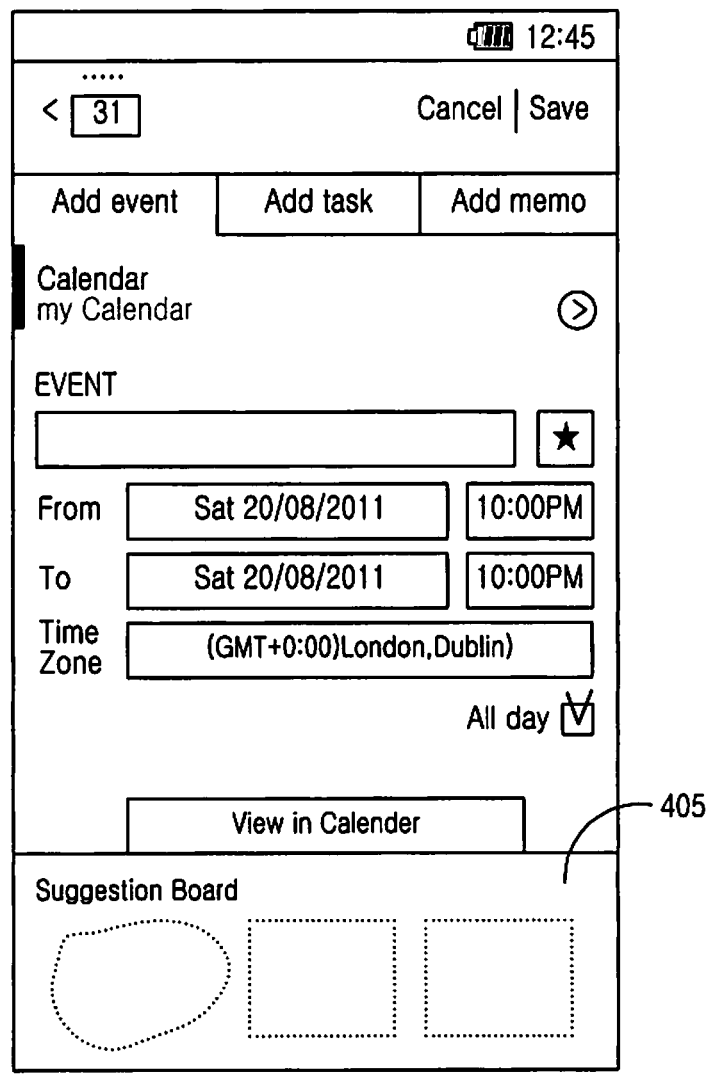

If it is confirmed that the electronic device receives a set third interaction from an input tool as shown in FIG. 4D, the electronic device may display a plurality of set content 405. In more detail, in order to receive at least one content among the plurality of displayed contents 405, the electronic device displays the plurality of displayed contents 405. Then, in order to receive at least one content among the plurality of displayed contents 405, the electronic device confirms that the selected content is inputted to the selected area.

Figure 5A:
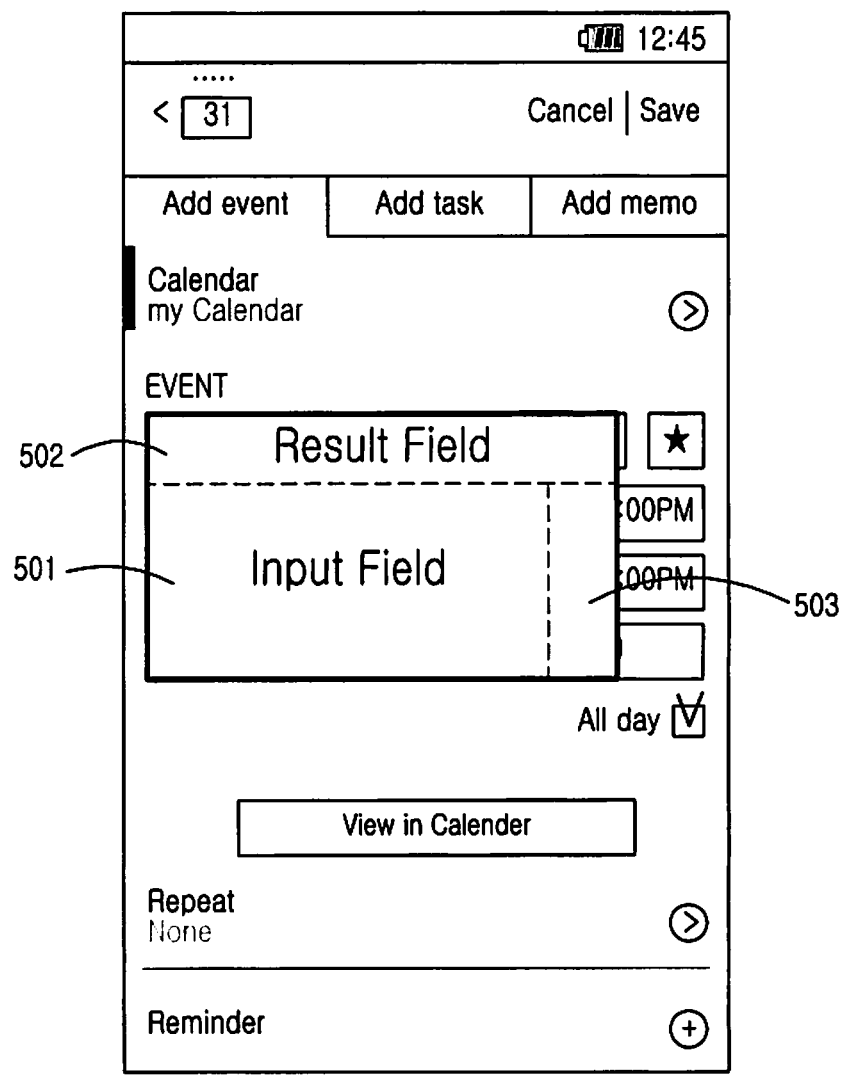
FIGS. 5A, 5B, 5C and 5D are views of auto scrolling a screen of an input field area by a set direction in an electronic device according to an embodiment of the present invention.
Figure 5B:
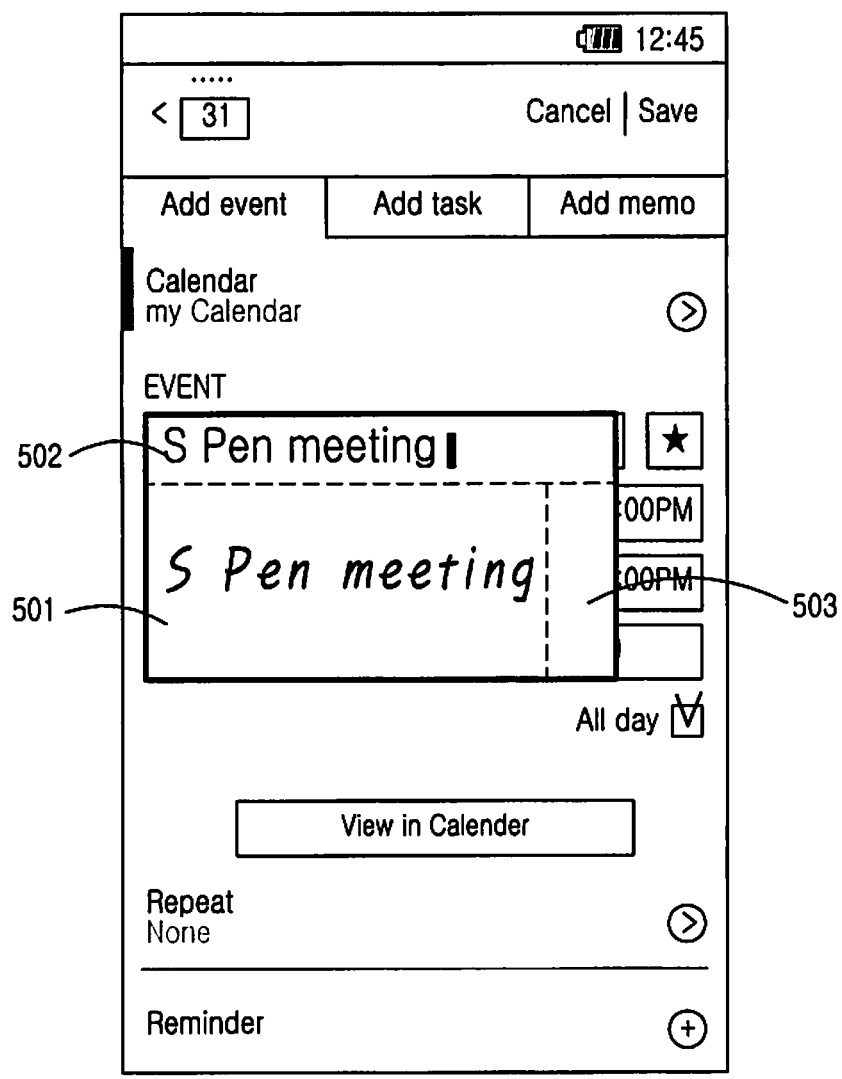
Figure 5C:
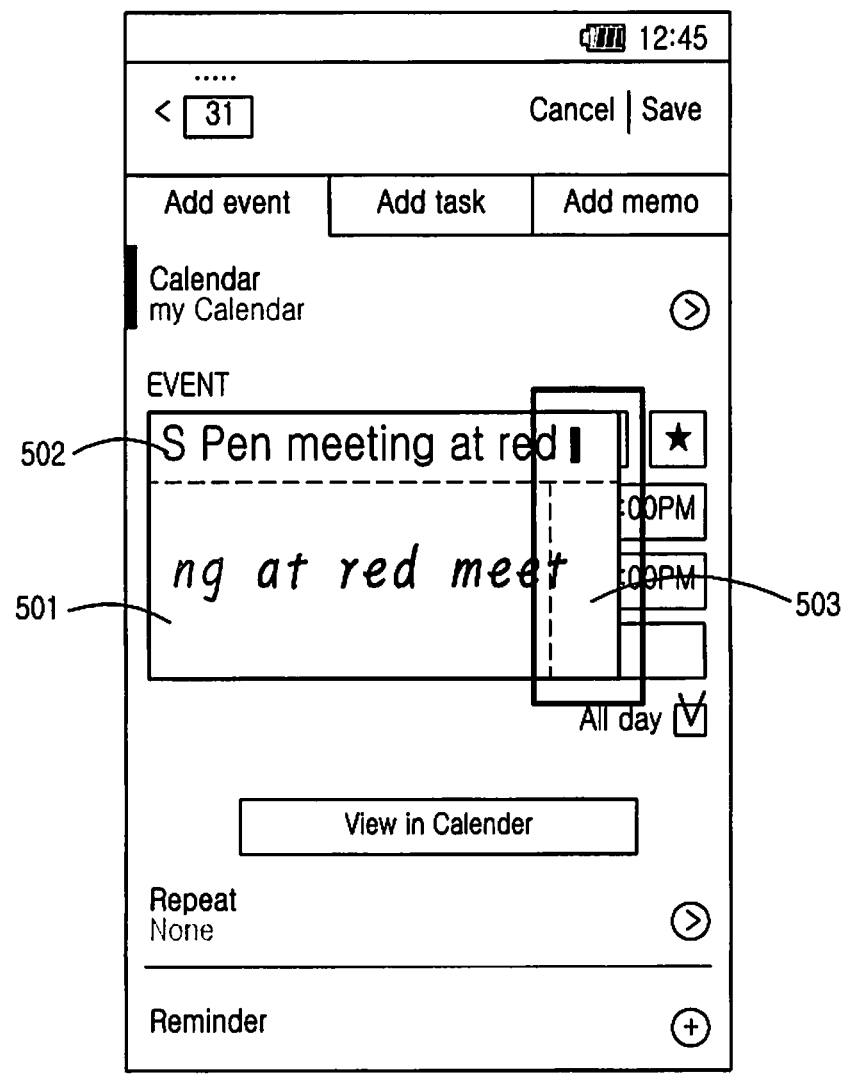

FIGS. 5A, 5B, 5C and 5D are views of auto-scrolling a screen of an input field area in a set direction in an electronic device according to an embodiment of the present invention. First, if it is confirmed that the electronic device receives a set first interaction from an input tool as shown in FIG. 5C, the electronic device displays an input field area 501 for receiving content in a selected area and a result field area 502 for displaying a content inputted to the input field area 501.

Here, the visual guide area 503 is included in the input field area 501 and displayed. The visual guide area 503 is an area for auto-scrolling a screen of the input field area 501 in a set direction when a content inputted to the input field area 501 is inputted.

Figure 5D:
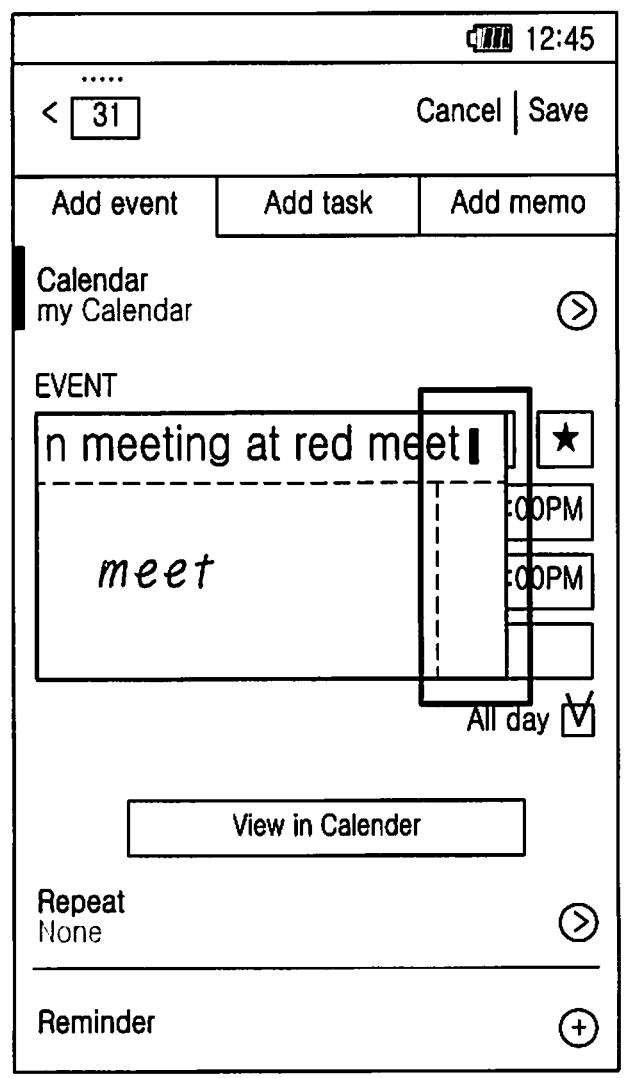

For example, as shown in FIGS. 5B to 5D, when receiving a text "S pen meeting" in the input field area 501, the electronic device may auto-scroll a cursor to the right direction, that is, a set direction by confirming that a text inputted to the visual guide area 503 is inputted. If a user wants to confirm again the auto-scrolled text, the input field area 501 may be scrolled to the left or right in order for confirmation.

Then, after it is confirmed that a content from the input field area 501 is received and a content inputted to the result field area 502 is displayed simultaneously, if the content input to the input field area 501 is completed, the electronic device displays the content displayed on the result field area 502 on a selected area in a set font.

For example, if a text "meeting" is inputted to the input field area 501 in a handwriting form, the electronic device displays the text "meeting" inputted to the input field area 501 on the result field area 502 simultaneously. Then, when it is confirmed that the content input to the input field area 501 is completed, the electronic device changes the text "meeting" displayed on the result field area 502 into a text in a set font and then displays the text in a selected area.

Figure 6A:
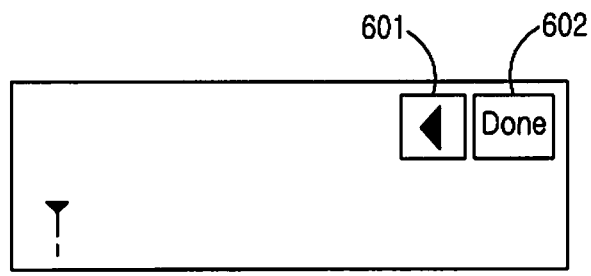
FIGS. 6A, 6B and 6C are views illustrating an extended concept of an input field area in an electronic device according to an embodiment of the present invention.
Figure 6B:
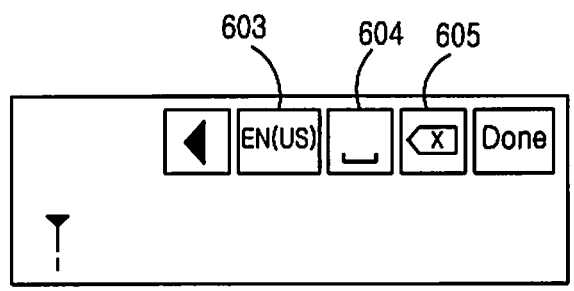
Figure 6C:
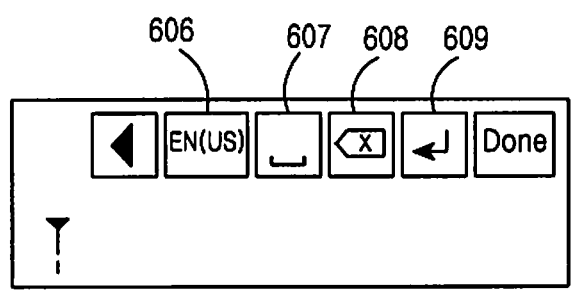

FIGS. 6A, 6B and 6C are views illustrating an extended concept of an input field area in an electronic device according to an embodiment of the present invention. First, as shown in FIG. 6A, the electronic device may display a plurality of buttons for controlling a content displayed on an input field area. In more detail, the electronic device may display a "more" button 601 for adding additional icons or buttons to the input field area and an "OK" button 602 for indicating that input is completed or done, where both buttons are provided for controlling a content displayed on an input field area so as to receive a user input.

For example, as shown in FIGS. 6B and 6C, when receiving an input from the "more" button 601, the electronic device additionally displays a button 603 for converting the language of a text displayed on an input field area, a space button 604 for providing a space, and a back space button 605 for deleting a written text. Furthermore, additional buttons may be displayed, such as an enter button 606 for changing a line.

In the above description, a "button for controlling a displayed content is displayed on an input field area" means that input available for all input field areas such as the affordance area are included.

FIGS. 7A, 7B, 7C and 7D are views illustrating an extended concept of an input field area in an electronic device according to another embodiment of the present invention. First, when a handwriting text is inputted to an input field area, the electronic device converts the inputted text into a text in a set font and displays it.

Figure 7A:
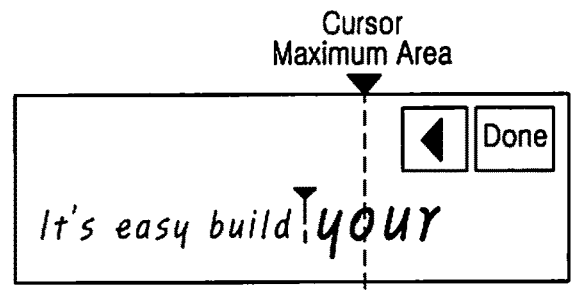
FIGS. 7A, 7B, 7C and 7D are views illustrating an extended concept of an input field area in an electronic device according to another embodiment of the present invention.
Figure 7B:
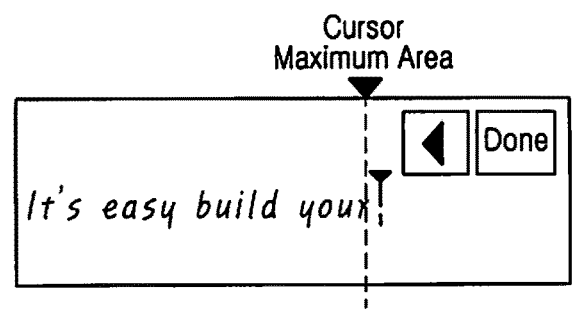

For example, as shown in FIGS. 7A and 7B, when receiving a text "It's easy build" in handwriting form, the electronic device converts the inputted text "It's easy build" into a text in a set font and then displays it. Then, when additionally receiving a text "your" in handwriting, the electronic device may add the inputted text "your" to the text "It's easy build" and thus may display a text "It's easy build your" on the input field area.

If it is confirmed that a text is inputted to a cursor maximum area, the electronic device may generate an extra area at the bottom. For example, as shown in FIG. 7B, as it is confirmed that the text "your" is added to the text "It's easy build" and thus inputted to the cursor maximum area, the electronic device generates an extra area at the bottom so as to receive the next text.

Figure 7C:
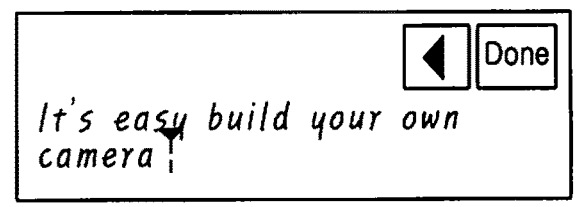
Figure 7D:
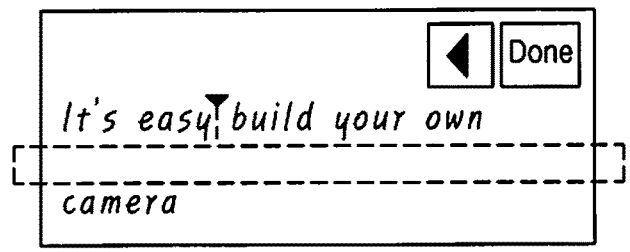

Moreover, the electronic device may generate an extra area between the lines of a text displayed on an input field area. For example, as shown in FIGS. 7C and 7D, when it is confirmed that a current cursor area moves down in a hovering state, the electronic device may generate an extra area between the lines of a text displayed on an input field area. That is, when it is confirmed that a cursor positioned at a text "easy" moves down in a hovering state, the electronic device may generate a dotted extra area between the lines of the text "It's easy build your own" and a text "camera". Accordingly, the electronic device may receive a new text in the dotted extra area.

FIGS. 8A, 8B, 8C and 8D are views illustrating an extended concept of an input field area in an electronic device according to another embodiment of the present invention. First, when a handwriting text is inputted to an input field, the electronic device converts the inputted text into a text in a set font and displays it.

Figure 8A:
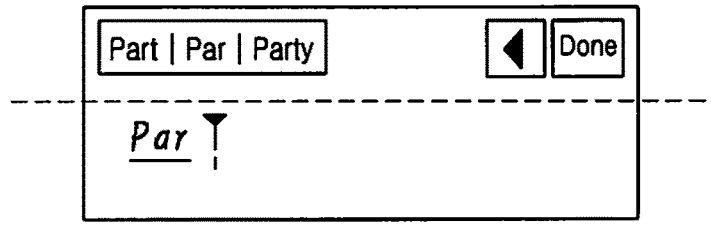
FIGS. 8A, 8B, 8C and 8D are views illustrating an extended concept of an input field area in an electronic device according to another embodiment of the present invention.

Then, the electronic device confirms whether a prediction function is executed, where the electronic device anticipates or predicts the complete word after only a few characters have been inputted. If it is determined that the prediction function is executed, the electronic device may display candidates of an expected word on the basis of a currently inputted text on a set area. For example, as shown in FIG. 8A, when receiving a text "par" in handwriting, the electronic device may display "part", "par", and "party", which are expected candidates on the basis of the inputted text "par", on a set area.

If candidates of an expected word are displayed in the middle of a text, the electronic device may display the candidates of the expected word on a corresponding word. Additionally, if it is determined that there are many candidates, the electronic device may provide a horizontal scroll.

Figure 8B:
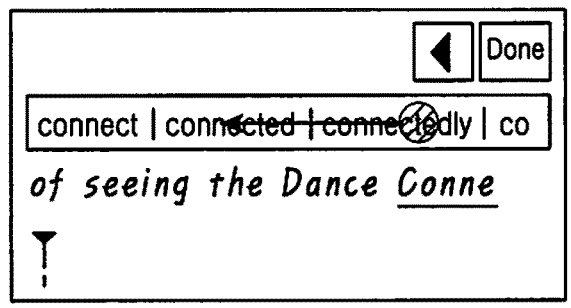

For example, as shown in FIG. 8B, when receiving a text "of seeing the Dance Conne", the electronic device may display "connect", "connected", and "connectedly", which are expected candidates on the basis of the inputted text "Conne", on the word "Conne". Additionally, if all the expected word candidates cannot be displayed on a set area, the electronic device may display some expected word candidates and then may display remaining expected word candidates as receiving a left or right scroll.

Moreover, when selecting one expected word from among expected word candidates displayed on the set area, the electronic device may change a word currently inputted to an area where a cursor is positioned into the selected word. Then, the electronic device may delete the expected word candidates displayed on the set area and may display the text that was inputted previously on the input field area.

Figure 8C:
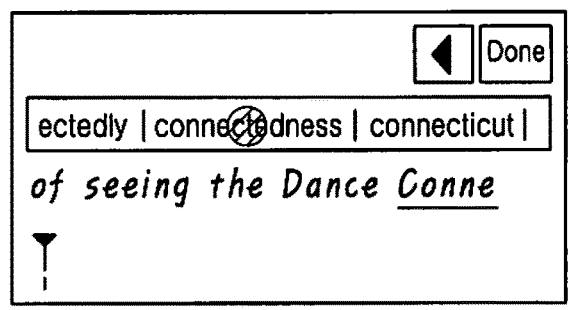
Figure 8D:
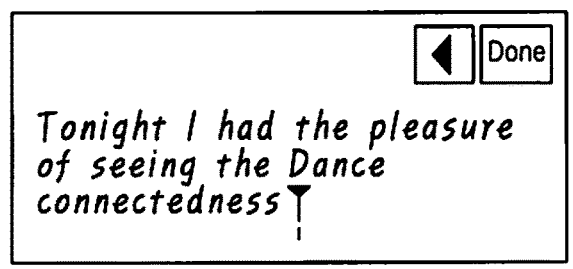

For example, as shown in FIGS. 8C and 8D, after receiving a text "of seeing the Dance Conne", if a word "connectedness" is selected from the expected word candidates displayed on the set area, the electronic device may add the selected word "connectedness" and then may display a text "Tonight I had the pleasure of seeing the Dance connectedness". Here, when displaying expected word candidates on a set area, if a button for converting the language of a displayed text, a space button for providing a space, and a back space button for deleting a written text are displayed, the electronic device may delete the displayed function buttons.

FIGS. 9A, 9B, 9C and 9D are views illustrating an extended concept of an input field area in an electronic device according to another embodiment of the present invention. First, after displaying an input field area for receiving a text on a set area, the electronic device may extend an initial input field area downward from an open point when receiving a text.

Figure 9A:
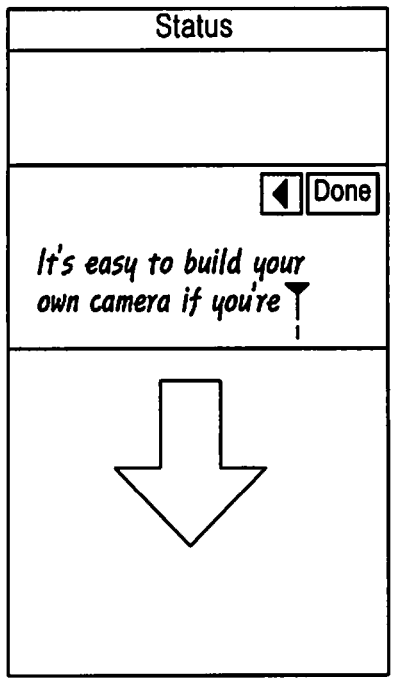
FIGS. 9A, 9B, 9C and 9D are views illustrating an extended concept of an input field area in an electronic device according to another embodiment of the present invention.
Figure 9B:
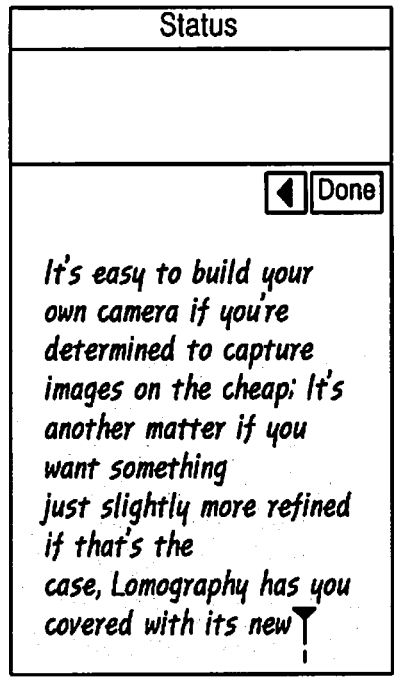

For example, as shown in FIGS. 9A and 9B, when receiving a text in an input field area, the electronic device may continuously extend an initial input field area downwardly from an open point.

Then, when continuously receiving a text, if it is confirmed that the input field area extends downwardly to a maximum, the electronic device may continuously extend the top portion of the input field area upwardly. Then, if it is confirmed that the top portion of the input field area extends to a maximum, the electronic device may scroll an initially displayed text from the top portion on a screen.

Figure 9C:
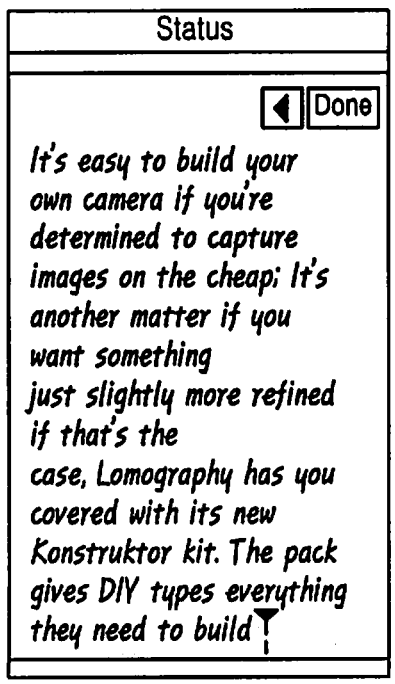
Figure 9D:
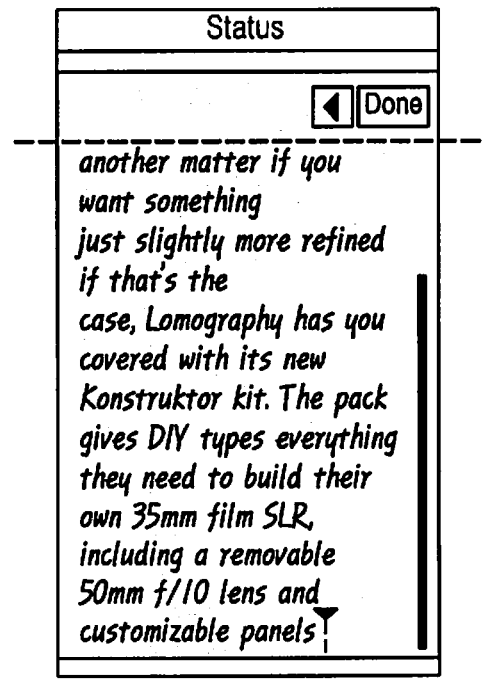

For example, as shown in FIGS. 9C and 9D, after the input field area extends in the bottom direction to the maximum as a text is continuously received in the input field area, if a text is received continuously, the electronic device may auto-scroll a text "It's easy to build your own camera if you're determined to capture image on the cheap; it's" displayed at the top in the upper direction.

FIGS. 10A, 110B, 10C and 10D are views illustrating an extended concept of an input field area in an electronic device according to another embodiment of the present invention. First, in FIG. 10A, the electronic device may sequentially delete the text displayed on the input field area on the basis of the point where a current cursor is located, if the delete button 1001 displayed on a set area is pressed. If the input field area extends toward the top higher than an initially open point, the electronic reduces the input field area from the top portion as the delete button 1001 is pressed, in FIG. 10B.

Figure 10A:
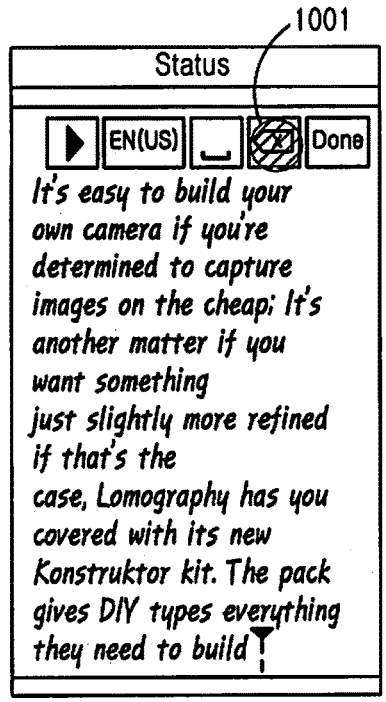
FIGS. 10A, 10B, 10C and 10D are views illustrating an extended concept of an input field area in an electronic device according to another embodiment of the present invention.
Figure 10B:
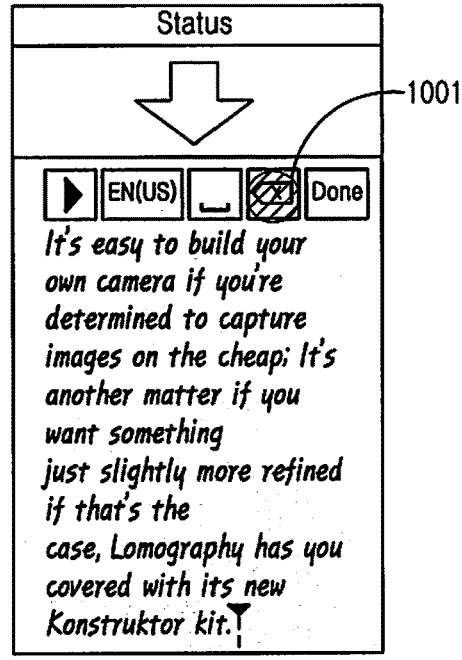

For example, as shown in FIG. 10A, if the delete button 1001 is pressed while the input field area extends toward the top higher than an initially open point, after deleting sequentially a displayed text, the electronic device reduces the input field area from the top in response to the delete button 1001. That is, as the delete button 1001 is pressed in FIG. 10B, the electronic device may reduce the input field area from the top by deleting a text "The pack gives DIY types everything they need to build"

If it is detected that the top portion of the input field area is reduced to the initially opened point, the electronic device may then reduce the bottom area of the input field area.

Figure 10C:
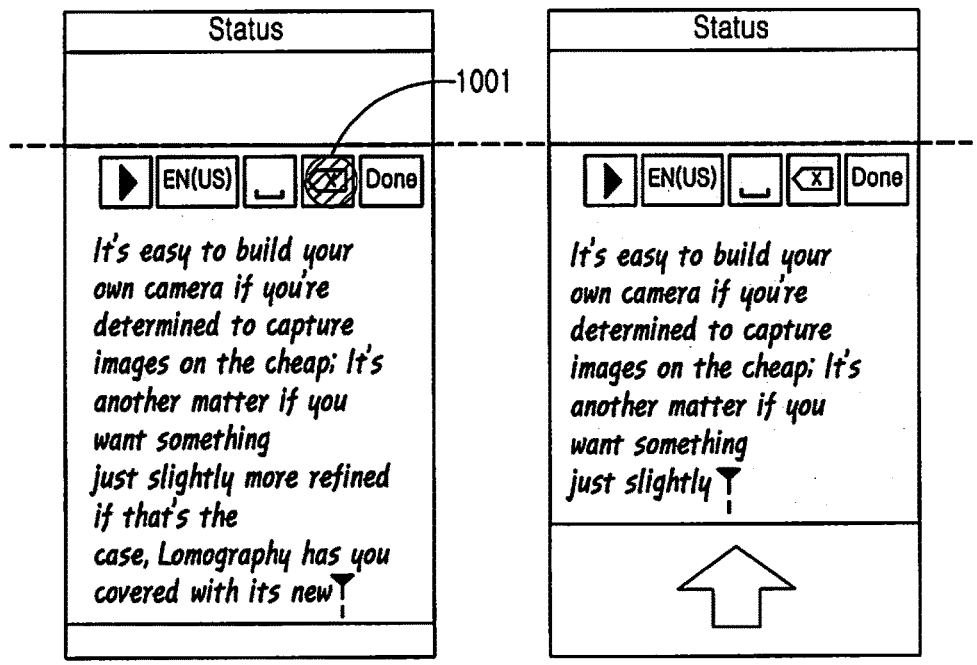
Figure 10D:
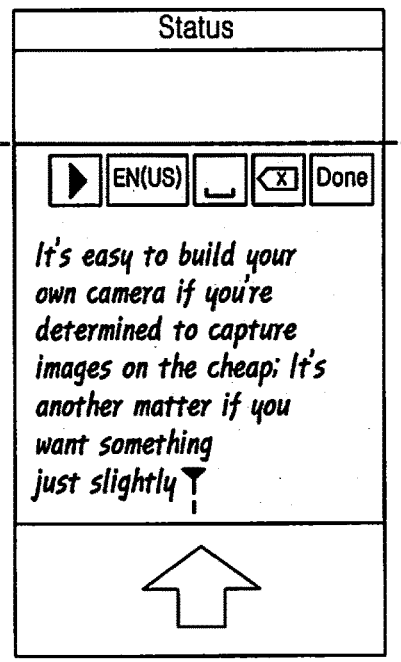
Figure 11A:
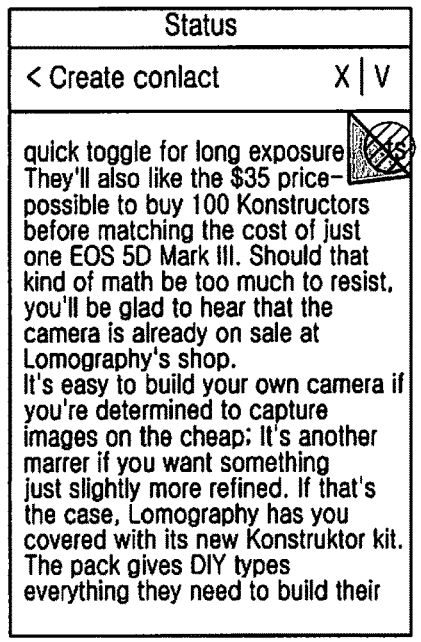
FIGS. 11A, 11B, 11C and 11D are views illustrating an extended concept of an input field area in an electronic device according to another embodiment of the present invention.

For example, as shown in FIGS. 10C and 10D, after it is detected that the input field area is reduced to the initially opened point as the delete button 1001 is pressed, the electronic device reduces the bottom area of the input field area if the delete button 1001 is continuously pressed. FIGS. 11A, 11B, 11C and 11D are views illustrating an extended concept of an input field area in an electronic device according to another embodiment of the present invention. First, an electronic device may receive an instruction for editing a displayed text. In more detail, the electronic device may switch to an edit mode for editing a displayed text by selecting a set area. For example, as shown in FIG. 11A, the electronic device switches to an edit mode for editing a displayed text by selecting a set area of a touch screen, as indicated by the turning over of a corner of the page in the upper right corner of the page.

Figure 11B:
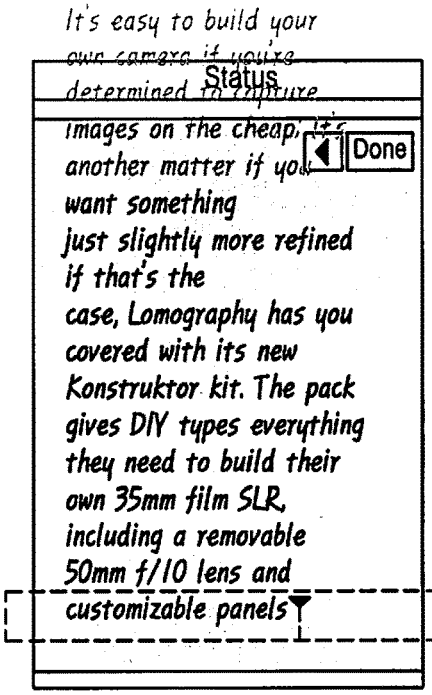

Then, the electronic device switches to an edit mode for inputting and deleting a text, and if a page is turned over as an input field area is initially opened, the electronic device may always display the text on the basis of the last line. For example, as shown in FIG. 11B, when switching to an edit mode for editing a displayed text, if a page is turned over when the input field area is initially opened, the text may be displayed on the basis of the last line "customizable panels".

Figure 11C:
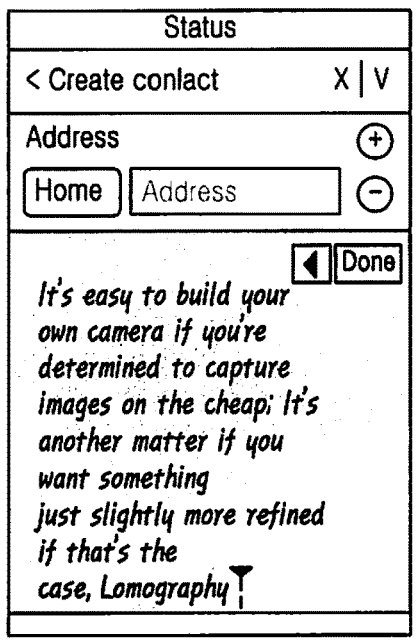
Figure 11D:
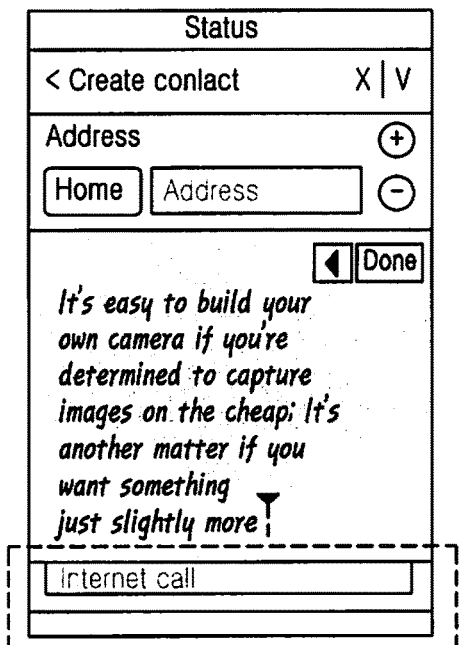

Then, upon receiving an instruction for deleting a displayed text, the electronic device deletes the displayed text up to a selected area. For example, as shown in FIGS. 11C and 11D, the electronic device may delete a text "refined if that's the case, Lomography".

Figure 12A:
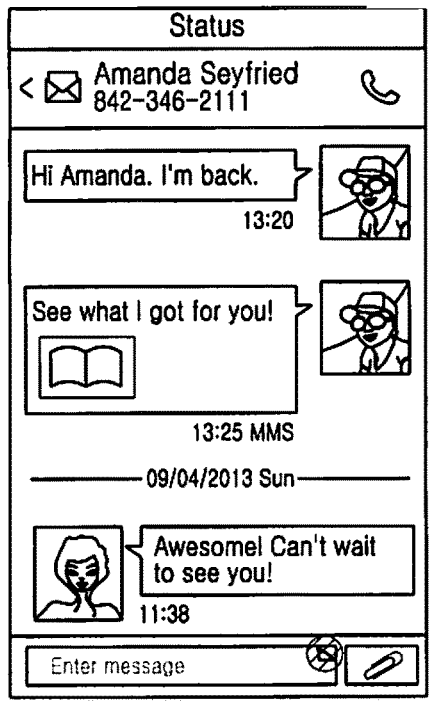
FIGS. 12A, 12B, 12C and 12D are views illustrating an extended concept of an input field area in an electronic device according to another embodiment of the present invention.

FIGS. 12A, 12B, 12C and 12D are views illustrating an extended concept of an input field area in an electronic device according to another embodiment of the present invention. First, the electronic device may select a set area from among displayed areas to receive content. For example, as shown in FIG. 12A, the electronic device selects a set area from among areas displayed at the bottom area of a touch screen, as indicated by the turning over of the corner of the page.

Figure 12B:
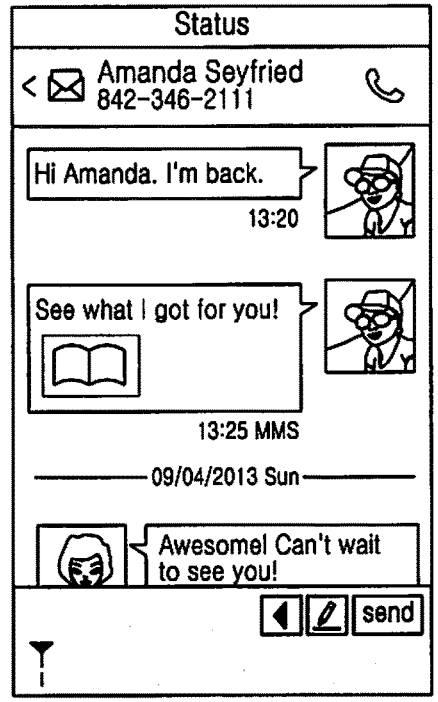

Then, as shown in FIG. 12B, the electronic device displays an input field area for receiving content on a set area. In more detail, the electronic device may open an input field area for receiving content on the basis of the bottom of a touch screen.

Figure 12C:
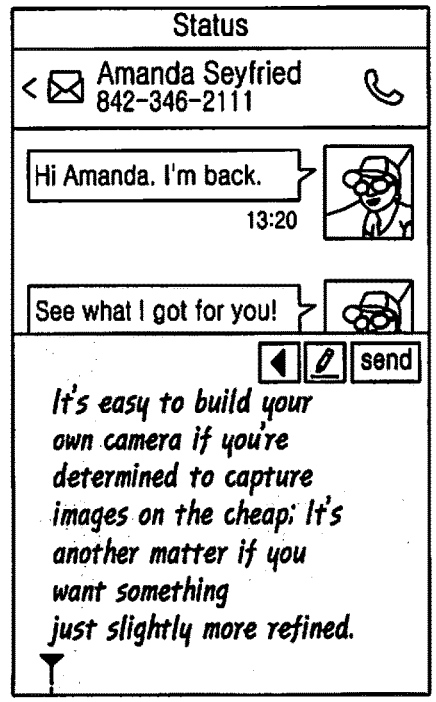
Figure 12D:
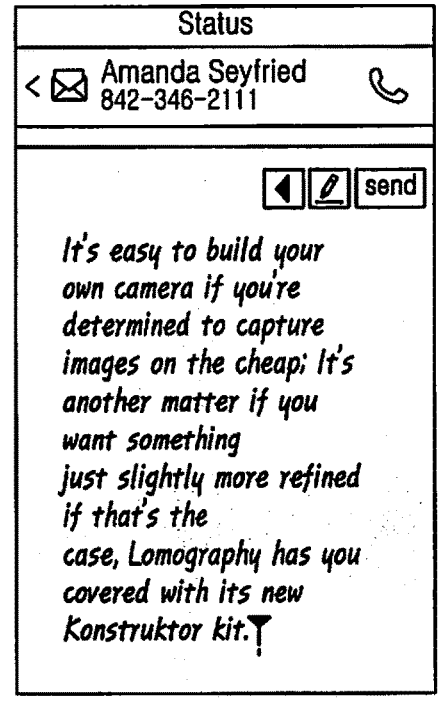

Then, as the electronic device receives content in the input field area, the size of an input field area is enlarged toward the top. For example, as shown in FIGS. 12C and 12D, as the electronic device receives a text in the input field area, it is confirmed that the size of the input field area is enlarged to the top.

Here, a cursor may be positioned at the end of the last line and the electronic device may display input content on the basis of the last line and provide a scroll.

FIGS. 13A, 13B, 13C and 13D are views illustrating an extended concept of an input field area in an electronic device according to another embodiment of the present invention. First, the electronic device may detect a displayed text scroll in the top or bottom direction while a cursor area of the displayed text is selected. The reason for this is that an entire displayed input field area is a drawing area. For example, as shown in FIGS. 13A and 13B, the electronic device detects that an input field area scrolls in the top or bottom direction while a cursor area is displayed at the bottom is selected.

Moreover, when detecting an operation for moving to the outside of the top or bottom of a screen while a cursor displayed on an input field area is held, the electronic device may detect that the input field area scrolls toward a detected direction. For example, as shown in FIGS. 13C and 13D, when detecting an operation for moving to the outside of the top of a screen while a cursor displayed on an input field area is held, the electronic device detects that the input field area scrolls to the top direction and confirms that a hidden text is displayed.

FIGS. 14A, 14B, 14C and 14D are views illustrating an extended concept of an input field area in an electronic device according to another embodiment of the present invention. First, when detecting that an arbitrary area in a displayed input field area is selected by two fingers and is scrolled in the top or bottom direction, the electronic device detects that the scrolling is faster compared to when the displayed input field area is selected by one finger and is scrolled. At this point, the electronic device may confirm that a cursor displayed on an arbitrary area of an input field area maintains a current state as a screen scrolls.

Figure 14A:
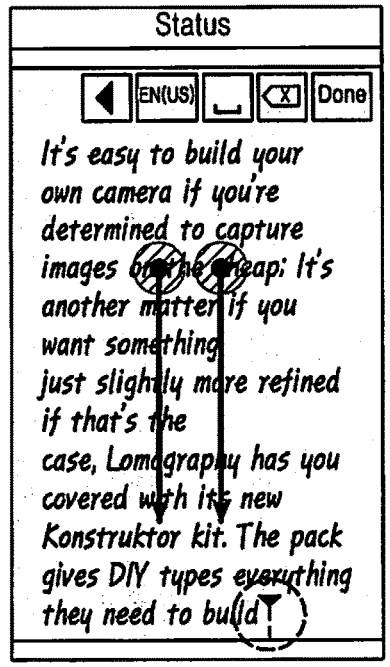
FIGS. 14A, 14B, 14C and 14D are views illustrating an extended concept of an input field area in an electronic device according to another embodiment of the present invention.
Figure 14B:
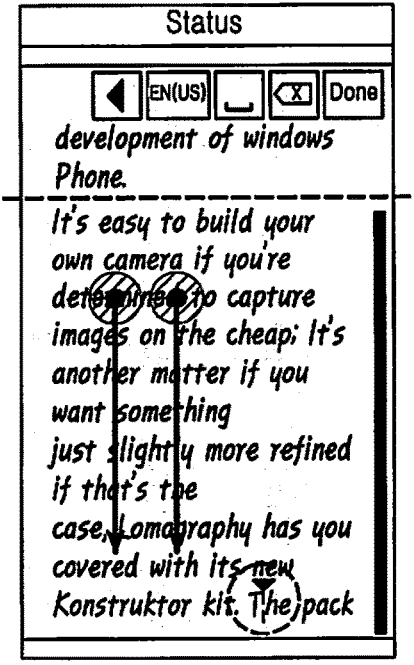
Figure 14C:
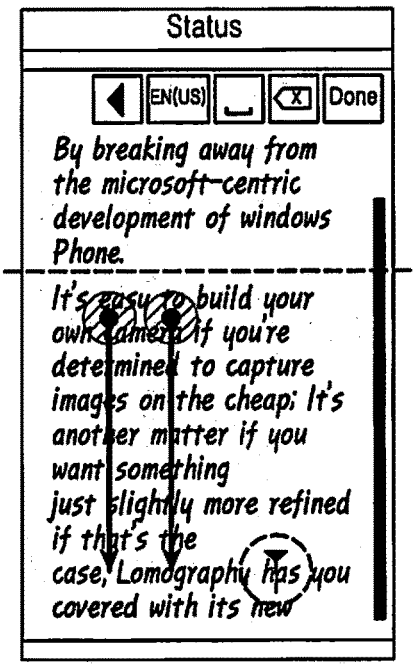

For example, as shown in FIGS. 14A to 14C, when detecting that an arbitrary area in a displayed input field area is selected by two fingers and is scrolled in the bottom direction, the electronic device detects that the scrolling is faster compared to when the displayed input field area is selected by one finger and is scrolled. At this point, the electronic device confirms that a cursor displayed on the bottom of an input field area continuously maintains its bottom position as a screen scrolls.

Figure 14D:
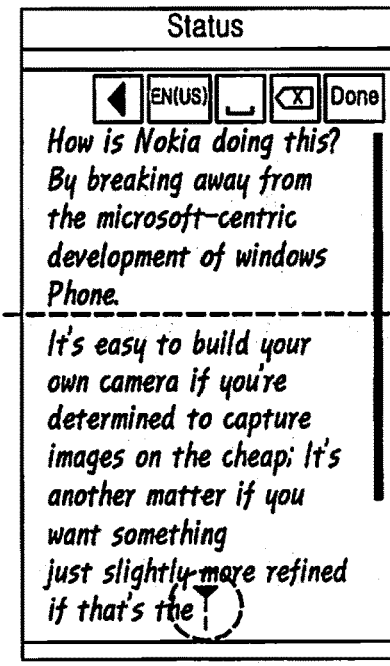

For example, as shown in FIG. 14D, the electronic device confirms that a cursor displayed on the bottom of an input field area moves to the left and right according to the position of a text and space.

Figure 15B:
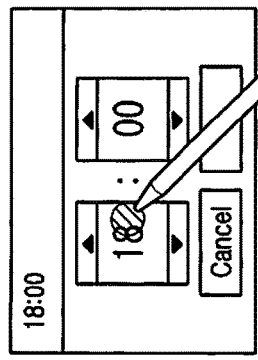
FIGS. 15A, 15B, 15C and 15D are views of receiving a time from an input tool in an electronic device according to an embodiment of the present invention.
Figure 15C:
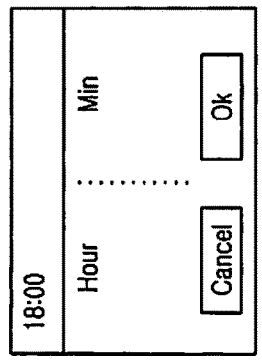
Figure 15D:
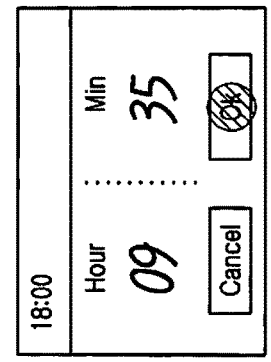
Figure 15A:
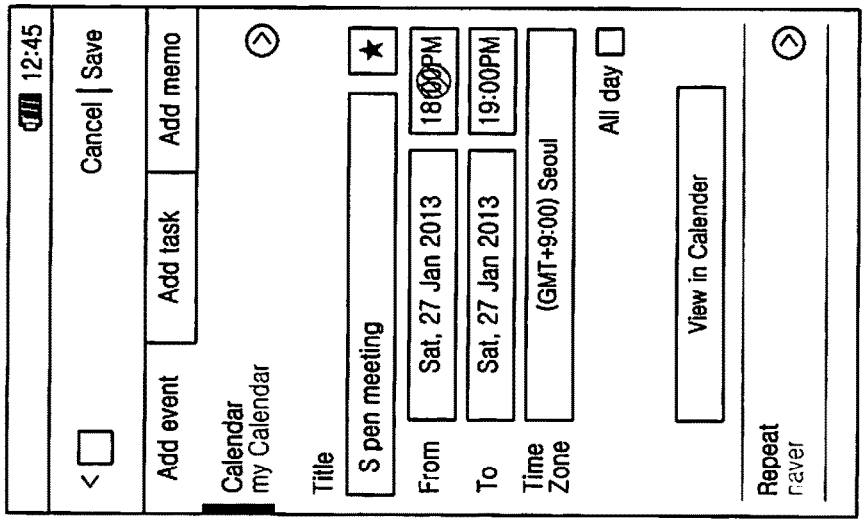

FIGS. 15A, 15B, 15C and 15D are views of receiving a time from an input tool in an electronic device according to an embodiment of the present invention. First, as shown in FIG. 15A, the display of the electronic device enters a setting area for setting a calendar application where a meeting schedule is inputted. For example, the display of the electronic device may enter a setting area displaying details of a meeting scheduled from 27 Jan. 2013 18:00 to 19:00 below a title "S pen meeting".

Then, as shown in FIG. 15B, when 18:00, a time at which a meeting starts, is selected as a first interaction, the electronic device displays an input field area for receiving a meeting time.

Then, as shown in FIGS. 15C and 15D, when an input field area for receiving a time is selected as a second interaction, the electronic device deletes an inputted time and receives a new meeting time. As shown in FIG. 15D, if 09:35 is received as a meeting time and then an OK button is inputted, the electronic device changes an existing meeting time from 18:00 into 09:35.

At this point, the electronic device maintains an existing field value as it is, if a field does not receive an input.

Figure 16:
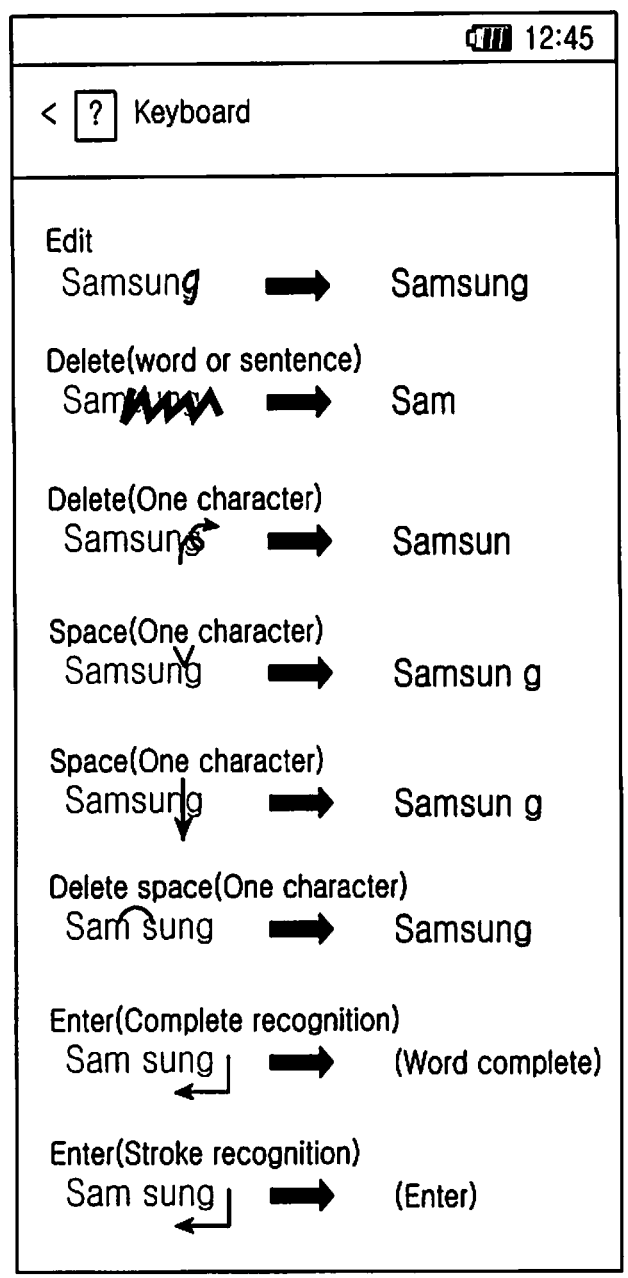
FIG. 16 is a view of editing a displayed text by recognizing a specific gesture from an input tool in an electronic device according to an embodiment of the present invention.

FIG. 16 is a view of editing a displayed text by recognizing a specific gesture from an input tool in an electronic device according to an embodiment of the present invention. First, the electronic device may edit a displayed text by recognizing each set gesture from an input tool. For example, as shown in FIG. 16, when handwriting is inputted on a displayed text through an input tool, the electronic device changes a text displayed as a handwritten inputted text. Additionally, when a gesture for deleting is inputted on the displayed text through an input tool, the electronic device deletes a text selected for deleting. Moreover, the electronic device may edit a displayed text by recognizing a set gesture such as word spacing, no word spacing, and a delete mark.

Figure 17A:
FIGS. 17A, 17B and 17C are views of providing set content by distinguishing a field attribute and an interaction of a selected area in an electronic device according to another embodiment of the present invention.
Figure 17B:
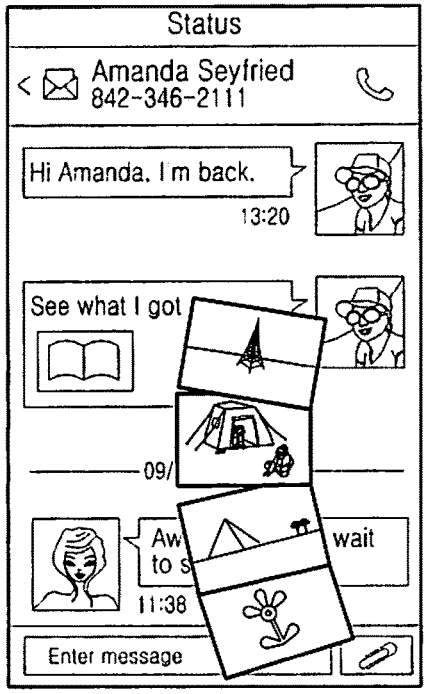
Figure 17C:
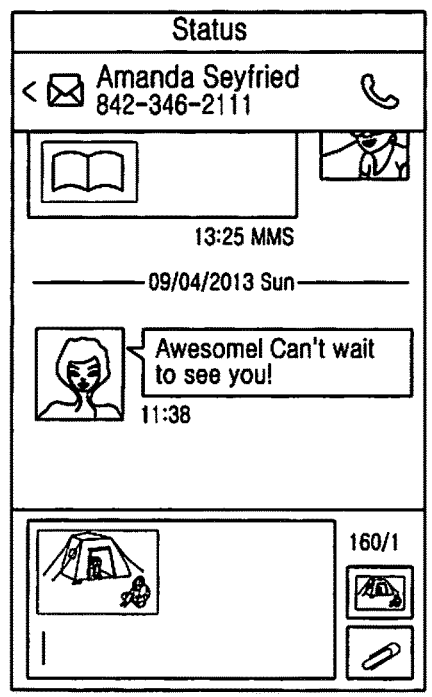

FIGS. 17A, 17B and 17C are views of providing set content by distinguishing a field attribute and an interaction of a selected area in an electronic device according to another embodiment of the present invention. First, as shown in FIG. 17A, the electronic device may select an arbitrary area for receiving content from an input tool.

Then, the electronic device determines which field among a plurality of fields corresponds to an area selected by an input tool. Here, the plurality of set fields may include an input field, a button field, and a contents field. In more detail, the input field is a field for inputting content such as text and images, the button field is a field for inputting set content, and the content field is a field for enlarging or reducing the size of a selected content to a set size or receiving a set edit menu.

If an area selected by an input tool is confirmed as a button field among a plurality of set fields, the electronic device confirms an inputted interaction selected by the input tool.

Then, if the interaction inputted from the input tool is confirmed as a set first interaction, the electronic device displays at least one content on a set area. In more detail, as shown in FIG. 17B, the electronic device may display a plurality of set contents, starting from a position where a button is displayed. For example, the electronic device may display the most recently captured images and videos and may display a captured image. Additionally, the electronic device may display contents having a relatively higher frequency among recently shared images and videos, recently edited images and videos, or shared images and videos than other contents. Additionally, the electronic device may display contents including an added contact, contents including contacts with a higher call frequency than other contacts, and contents including an updated contact.

Additionally, the electronic device may detect an operation for flicking a plurality of displayed contents and may detect that the plurality of displayed contents move in a set direction such as a clockwise direction, a counterclockwise direction, an upper direction, and a lower direction.

As shown in FIGS. 17B and 17C, if it is confirmed that the second image among the displayed images is selected as a set second interaction, the electronic device confirms that the second image selected as the second interaction is inputted to a set area.

That is, from the user's perspective, a content that a user wants may be immediately and easily inputted during a conversation application with the other party by varying an interaction without exiting the conversation application during the conversation.

Figure 18C:
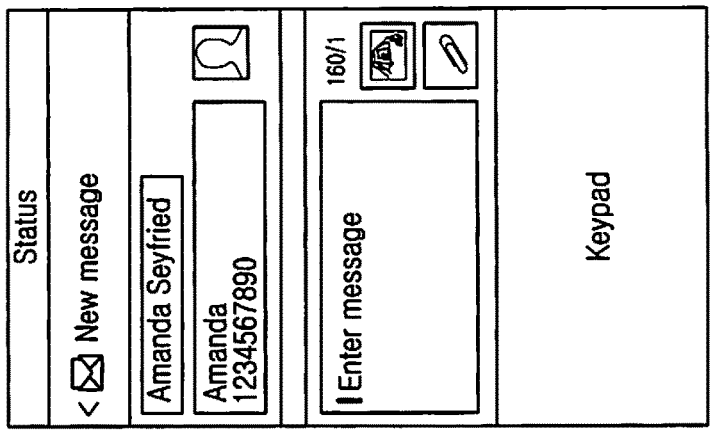
FIGS. 18A, 18B and 18C are views of providing set content by distinguishing a field attribute and an interaction of a selected area in an electronic device according to another embodiment of the present invention.
Figure 18B:
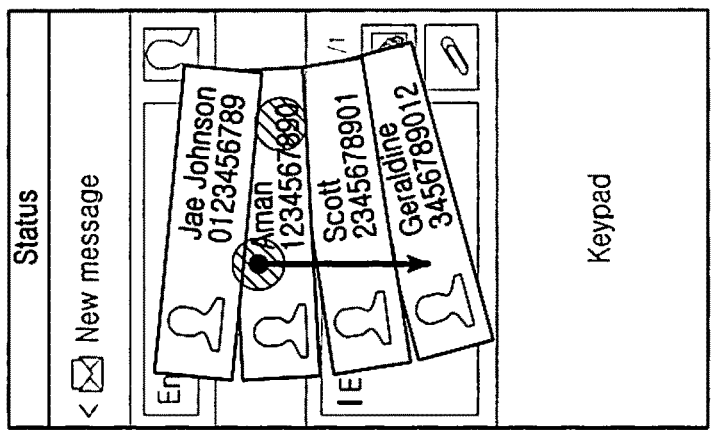
Figure 18A:
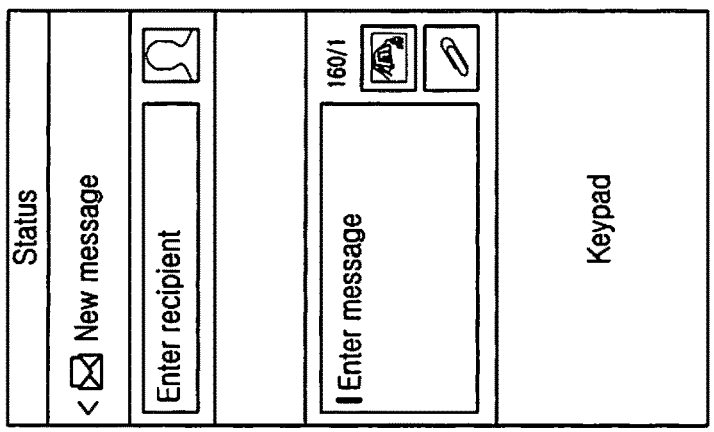

FIGS. 18A, 18B and 18C are views of providing set content by distinguishing a field attribute and an interaction of a selected area in an electronic device according to another embodiment of the present invention. First, as shown in FIG. 18A, the electronic device selects an arbitrary area for receiving content from an input tool.

Then, the electronic device determines which field among a plurality of fields corresponds to an area selected by an input tool. Here, the plurality of set fields may include an input field, a button field, and a contents field, as described above.

If an area selected by an input tool is confirmed as a button field among a plurality of set fields, the electronic device confirms an inputted interaction selected by the input tool.

Then, if the interaction inputted from the input tool is confirmed as a set first interaction, the electronic device displays at least one content on a set area. In more detail, as shown in FIG. 18B, the electronic device may display a plurality of set contents, starting from a position where a button is displayed. For example, the electronic device displays an image including frequently used contacts.

Additionally, the electronic device may detect an operation for flicking a plurality of displayed contents and may detect that the plurality of displayed contents move in a set direction such as a clockwise direction, a counterclockwise direction, an upper direction, and a lower direction.

As shown in FIGS. 18B and 18C, if it is confirmed that the second image among the displayed images is selected as a set second interaction, the electronic device confirms that the second image selected as the second interaction is inputted to a set area.

Figure 19A:
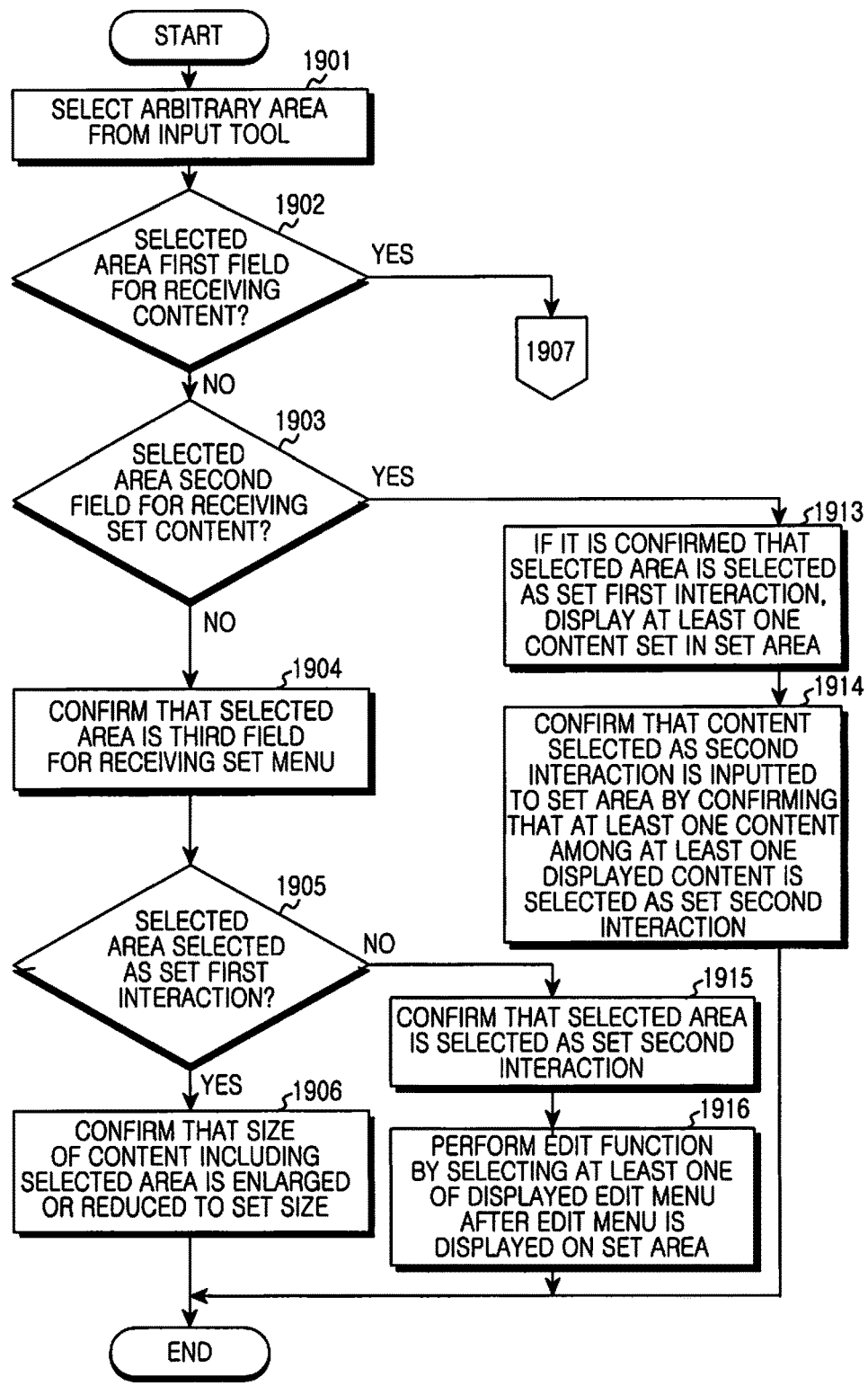
FIGS. 19A and 19B are flowcharts illustrating an operation order of an electronic device according to an embodiment of the present invention.
Figure 19B:
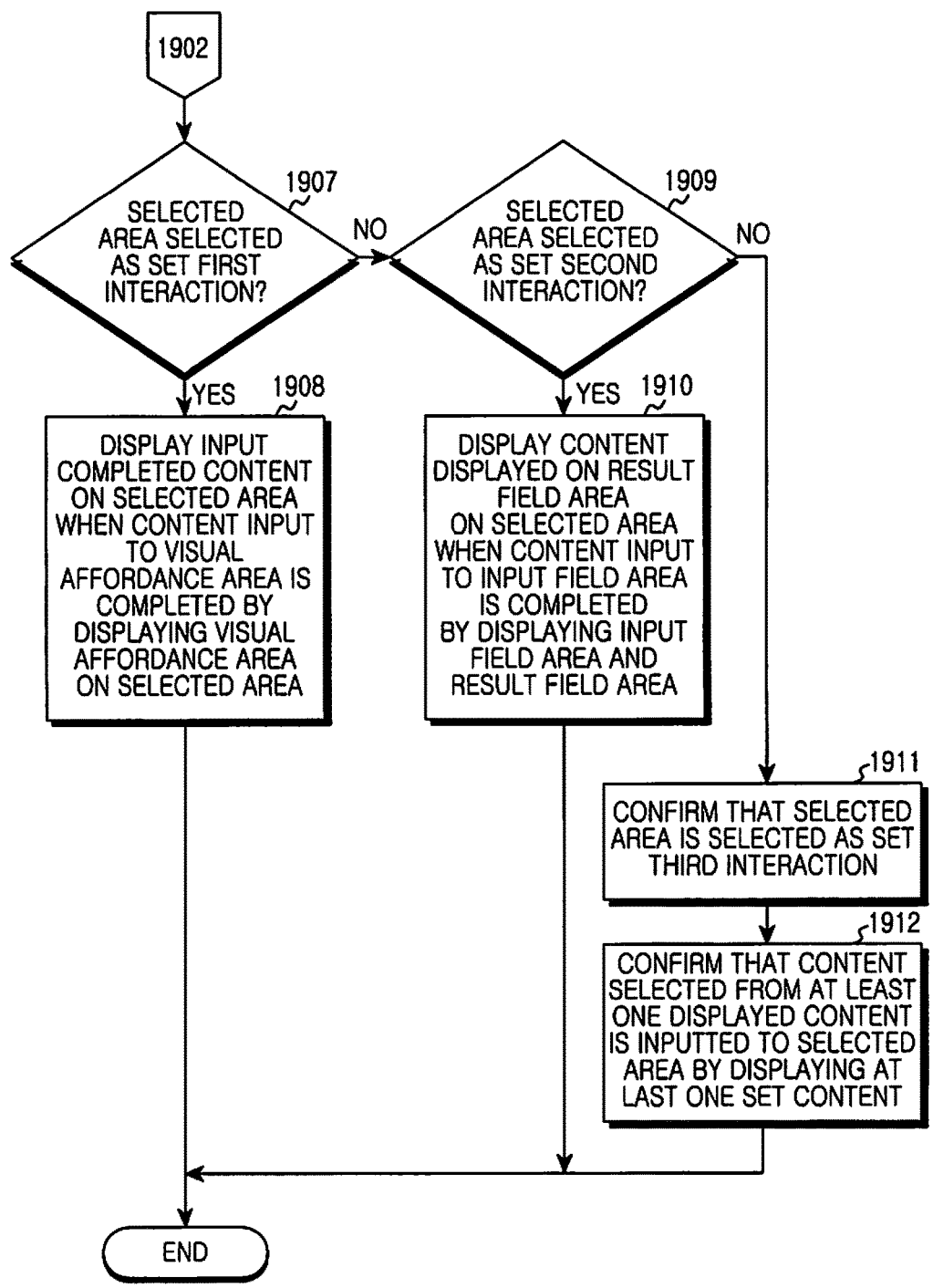

FIGS. 19A and 19B are flowcharts illustrating an operation order of an electronic device according to an embodiment of the present invention. As shown in FIG. 19A, the electronic device selects an arbitrary area from an input tool in step 1901. In more detail, the electronic device may receive an arbitrary area for receiving content from an external device or a user. Here, the external device may be an input tool such as a stylus pen.

Then, the electronic device determines whether the selected area is a first field for receiving content in step 1902. Here, the first field may be a field for inputting content such as a text and an image.

If the selected area is not determined as the first field for receiving content in step 1902, the electronic device determines whether the selected area is a second field for providing set content in step 1903. Here, the second field may be a field for inputting set content.

If the selected area is not determined as the second field for receiving set content in step 1903, the electronic device confirms that the selected area is a third field for providing a set menu in step 1904. Here, the third field may be a field for enlarging or reducing the size of the selected content to a set size and receiving a set edit menu.

Then, the electronic device determines whether the selected area is selected as a set first interaction in step 1905. Here, when a tool such as a stylus pen is used as an input tool, the set specific interaction may be made using pen hover, pen hover and hold, pen touch, pen touch and hold, pen hover by button input, pen hover and hold by button input, pen touch by button input, and pen touch and hold function. If an input tool is a user's finger, all the functions except for the button input may be included.

If it is confirmed that the selected area is selected as the set first interaction in step 1905, the electronic device confirms that the selected content including the selected area is enlarged or reduced to a set size in step 1906.

In step 1902, if the selected area is determined as the first field for receiving content, the electronic device determines whether the selected area is selected as the set first interaction in step 1907, as shown in FIG. 19B.

If it is confirmed that the selected area is selected as the set first interaction in step 1907, the electronic device displays a visual affordance area on a set area and if a content input to the visual affordance area is completed, displays the input completed content on the selected area in step 1908. For example, after receiving a text "meeting" from the visual affordance area 402 and then selecting an area other than the visual affordance area, the electronic device confirms that a text input is completed to delete the displayed affordance area and displays the inputted text "meeting" on the selected area. Here, the visual affordance area may be included in a user interface.

If it is confirmed that the selected area is not selected as the set first interaction in step 1907, the electronic device determines whether the selected area is selected as a set second interaction in step 1909.

If it is determined that the selected area is selected as the set second interaction in step 1909, the electronic device displays an input field area and a result field area and if a content input to the input field area is completed, displays a content displayed on the result field area on a selected area in step 1910. For example, if a text "meeting" is inputted to the input field area, the electronic device displays the text "meeting" inputted to the input field area on the result field area simultaneously. Then, when it is confirmed that the content input to the input field area is completed, the electronic device displays the text "meeting" displayed on the result field area on a selected area.

If it is confirmed that the selected area is not selected as the set second interaction in step 1909, the electronic device confirms that the selected area is selected as a set third interaction in step 1911.

Then, the electronic device displays at least one set content and may confirm that a content selected from the displayed at least one set content is inputted to a selected area in step 1912.

In step 1903, if the selected area is determined as the second field for receiving set content, the electronic device displays at least one set content on a set area when the selected area is selected as the set first interaction in step 1913.

Then, the electronic device confirms that one content among the displayed at least one set content is selected as the set second interaction and then confirms that the content selected as the second interaction is inputted to a set area in step 1914.

In step 1905, if it is confirmed that the selected area is not selected as the set first interaction, the electronic device confirms that the selected area is selected as the set second interaction in step 1915.

Then, the electronic device displays an edit menu on a set area and receives at least one among the displayed edit menu to perform an edit function in step 1916.

Figure 20:
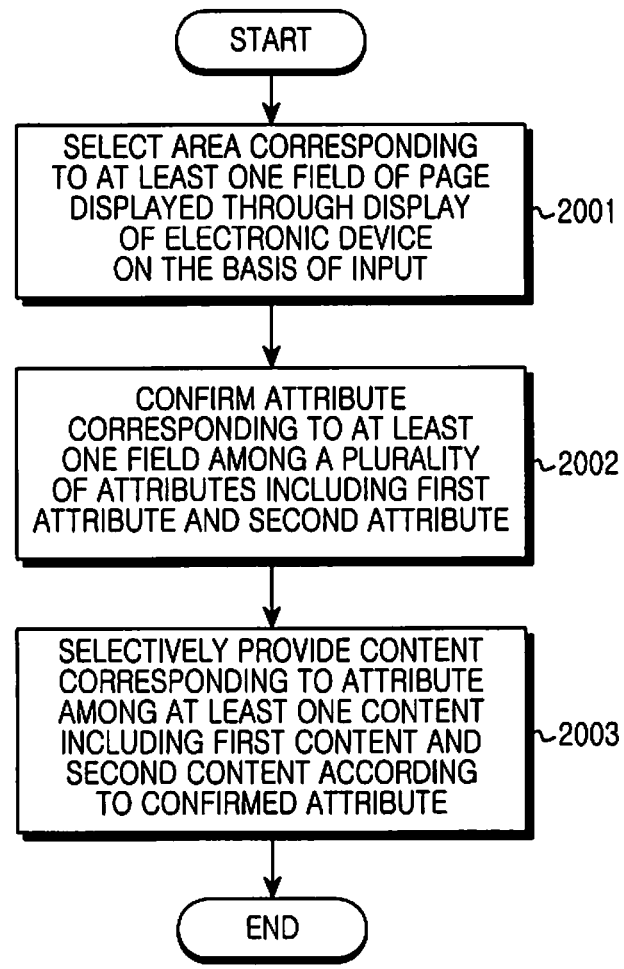
FIG. 20 is a flowchart of providing content according to a field attribute according to an embodiment of the present invention.

FIG. 20 is a flowchart of providing content according to a field attribute according to an embodiment of the present invention. As shown in FIG. 20, the electronic device selects an area corresponding to at least one field of a page displayed through a display of the electronic device on the basis of an input in step 2001. In more detail, the electronic device receives an arbitrary area for receiving content from an external device or a user. Here, the external device may be an input tool such as a stylus pen.

Then, the electronic device confirms an attribute corresponding to at least one field among a plurality of attributes including a first attribute and a second attribute in step 2002. In more detail, the electronic device confirms that the selected area is included in one of an input field for inputting content such as text and image, a button field for inputting set content, and a content field for enlarging or reducing the size of a selected content to a set size or receiving a set edit menu.

Then, the electronic device selectively provides a content corresponding to an attribute among at least one content including a first content and a second content according to the confirmed attribute in step 2003. If the field confirmed by the electronic device is determined to be an input field, the electronic device provides a content for inputting content such as a text or image. Additionally, if the field confirmed by the electronic device is determined to be a button field, the electronic device provides a content for inputting a set content. Additionally, if the field confirmed by the electronic device is determined to be a content field, the electronic device displays a content for providing a set edit menu. Additionally, a content inputted from the outside of the electronic device may include at least one of a text, image, or voice inputted through an input tool such as a user's finger, an electronic pen, or a mike.

Figure 21C:
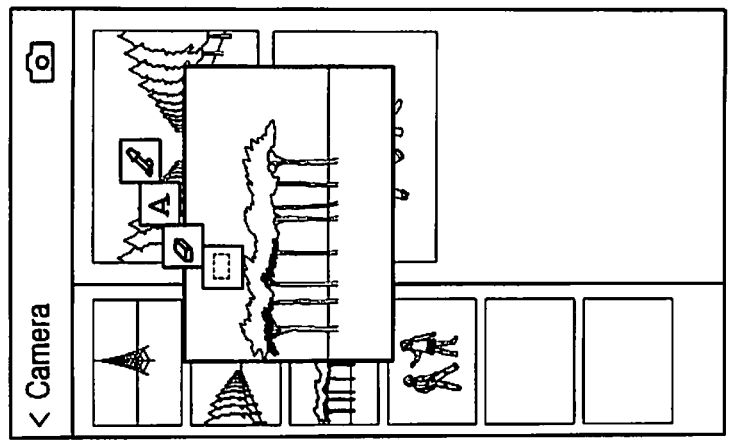
FIGS. 21A, 21B and 21C are views of providing set content by distinguishing a field attribute and an interaction of a selected area in an electronic device according to another embodiment of the present invention.
Figure 21B:
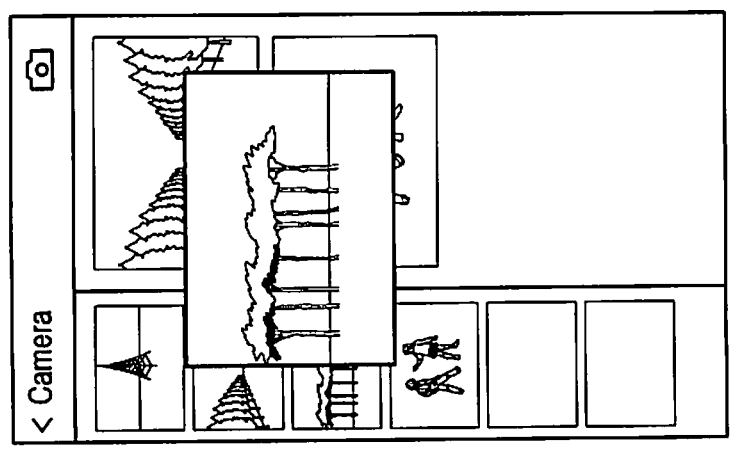
Figure 21A:
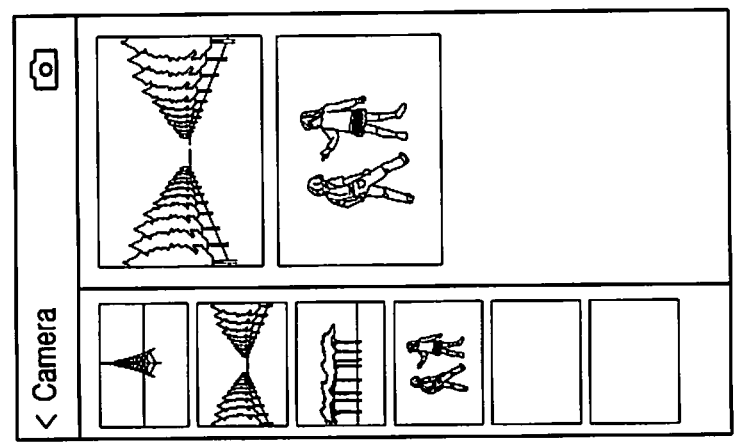

FIGS. 21A, 21B and 21C are views of providing set content by distinguishing a field attribute and an interaction of a selected area in an electronic device according to another embodiment of the present invention. As shown in FIG. 21A, the electronic device selects one content from displayed contents through an input tool.

Then, the electronic device determines which field among a plurality of fields corresponds to an area selected by an input tool. Here, the plurality of set fields include an input field, a button field, and a contents field. In more detail, the input field is a field for inputting content such as text and image, the button field is a field for inputting set content, and the content field is a field for enlarging or reducing the size of a selected content by a set size or receiving a set edit menu.

If an area selected by an input tool is confirmed as a content field among a plurality of set fields, the electronic device confirms an inputted interaction selected by the input tool.

Then, if the interaction inputted from the input tool is confirmed as a set first interaction, the electronic device enlarges or reduces the content selected from the input tool and displays it. For example, as shown in FIG. 21B, when one content among contents displayed on a touch screen is selected as a first interaction, the electronic device enlarges the selected content and displays it.

In the same manner, although not shown in FIG. 21B, when one content among contents displayed on a touch screen is selected as a second interaction, the electronic device reduces the selected content and display it.

If the interaction inputted from the input tool is confirmed as a set third interaction, the electronic device displays an edit menu for editing the content selected from the input tool on a set area. For example, as shown in FIG. 21C, when one content among contents displayed on a touch screen is selected as a third interaction, the electronic device displays an edit menu including an edit icon for editing the selected content on a set area. For example, the electronic device may preferentially display a relatively often selected edit menu and the most recently selected edit menu on a set area.

It will be appreciated that embodiments of the present invention according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device including a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing an apparatus or a method as claimed in any one of the claims of this specification and a machine-readable storage storing such a program. Still further, such programs may be conveyed electronically via any medium such as a communication signal carried over a wired or wireless connection and the embodiments suitably encompass the same.

While the invention has been shown and described with reference to certain embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus, comprising:
a touch-screen; and
at least one processor coupled to the touch-screen, wherein the at least one processor is configured to:
control the touch-screen to display a user interface (UI) including an object capable of inputting text data;
detect an input means of a first type over the object by a user, wherein an end of the input means of the first type is positioned in a first position spaced apart from the object being displayed in the touch-screen;
in response to detecting, the input means of the first type, control the touch-screen to display, in the object, a visual affordance for guiding that the object is capable of receiving a handwritten text inputted by the user;
detect an input means of a second type over the object by the user, wherein the end of the input means of the second type is moved from the first position in contact with the object to a second position in which the visual affordance is displayed;
in response to detecting, the input means of the second type, control the touch-screen to display an input area and a result area which are superimposed on the object, wherein the input area is usable for receiving the handwritten text; and
in response to receiving the handwritten text on the input area, display the handwritten text in the input area and display a text in the result area with a designated font changed from the handwritten text.

2. The apparatus of claim 1, wherein the input of the first type corresponds to a hovering input and the input of the second type corresponds to a touch input.

3. The apparatus of claim 1,
wherein the at least one processor is further configured to:
in response to detecting an input of a third type, distinct from the first type and the second type, on the object, control the touch-screen to display a window superimposed on the UI, comprising a plurality of contents which are capable of being inputted via the object, instead of displaying the visual affordance or the input area for receiving the handwritten text.

4. The apparatus of claim 1, wherein the at least one processor is further configured to:
detect that the text, inputted to the input area, is inputted in a designated area located at one end of the input area, wherein the designated area is included in the input area, and
in response to detecting that the text, inputted to the input area, is inputted in the designated area, enlarge the input area downward so that the input area comprises an extra area below the text.

5. The apparatus of claim 1, wherein the at least one processor is further configured to:
in response to detecting a designated gesture, convert the text included in the input area, according to the detected gesture; and
control the touch-screen to display the converted text in the input area.

6. The apparatus of claim 1, wherein the at least one processor is further configured to:
control the touch-screen to display another object for setting a time for a schedule;
in response to detecting the input of the first type on the another object, control the touch-screen to display a first window for displaying a predetermined time information; and
in response to detecting the input of the second type on the another object, control the touch-screen to display a second window for receiving a time information from an input tool, instead of displaying the first window.

7. The apparatus of claim 1, wherein the at least one processor is further configured to:
enlarge the input area downward as the text is inputted in the input area,
when the input area is maximally enlarged downward, enlarge the input area upward as the text is inputted in the input area.

8. The apparatus of claim 1, wherein each of the input of the first type and the input of the second type corresponds to at least one of a hovering input, a hovering and holding input, a touch input, a touch and hold input, a hovering input by pressing a button on a stylus pen, a hovering and holding input by pressing a button on a stylus pen, and a touch input by pressing a button on a stylus pen.

9. A method in an electronic device, the method comprising:
displaying a user interface (UI) including an object capable of inputting text data;
detecting an input means of a first type over the object by a user, wherein an end of the input means of the first type is positioned in a first position spaced apart from the object being displayed in the touch-screen;
in response to detecting, the input means of the first type, displaying, in the object, a visual affordance for guiding that the object is capable of receiving a handwritten text inputted by the user;
detect an input means of a second type over the object by the user, wherein the end of the input means of the second type is moved from the first position in contact with the object to a second position in which the visual affordance is displayed;
in response to detecting, the input means of the second type, displaying an input area and a result area which are superimposed on the object, wherein the input area is usable for receiving the handwritten text; and
in response to receiving the handwritten text on the input area, displaying the handwritten text in the input area and displaying a text in the result area with a designated font changed from the handwritten text.

10. The method of claim 9, wherein the input of the first type corresponds to a hovering input and the input of the second type corresponds to a touch input.

11. The method of claim 9, wherein the method further comprises:
in response to detecting an input of a third type, distinct from the first type and the second type, on the object, displaying a window superimposed on the UI, comprising a plurality of contents which are capable of being inputted via the object, instead of displaying the visual affordance or the input area for receiving the handwritten text.

12. The method of claim 9, further comprising:
detecting that the text, inputted to the input area, is inputted in a designated area located at one end of the input area, wherein the designated area is included in the input area, and
in response to detecting that the text, inputted to the input area, is inputted in the designated area, enlarging the input area downward so that the input area comprises an extra area below the text.

13. The method of claim 9, further comprising:
in response to detecting a designated gesture, converting the text included in the input area, according to the detected gesture; and
displaying the converted text in the input area.

14. The method of claim 9, further comprising:
displaying an another object for setting a time for a schedule;
in response to detecting the input of the first type on the another object, displaying a first window for displaying a predetermined time information; and
in response to detecting the input of the second type on the another object, displaying a second window for receiving a time information from an input tool, instead of displaying the first window.

15. The method of claim 9, further comprising:
enlarging the input area downward as the text is inputted in the input area,
when the input area is maximally enlarged downward, enlarging the input area upward as the text is inputted in the input area.

16. The method of claim 9, wherein each of the input of the first type and the input of the second type corresponds to at least one of a hovering input, a hovering and holding input, a touch input, a touch and hold input, a hovering input by pressing a button on a stylus pen, a hovering and holding input by pressing a button on a stylus pen, and a touch input by pressing a button on a stylus pen.

17. An apparatus comprising:
a touch-screen; and
at least one processor configured to:
control the touch to display a user interface (UI) including a first object into which a content to be attached for the UI is displayed and a second object for receiving an input for selecting the content to be attached in the UI;
in response to detecting that an end of an input means is positioned in a first position hovering over the second object being displayed in the touch-screen, determine one or more contents among a plurality of contents attachable via the second object, based on information stored as being associated with the plurality of contents;
in response to determining the one or more attachable contents, control the touch-screen to display one or more thumbnail images, which are superimposed on the UI, representing the determined one or more attachable contents;
in response to receiving a flick input on an area associated with the displayed one or more thumbnail images, display the one or more thumbnail images which move in a direction of the flick input; and
in response to detecting that the end of the input means is in contact with a thumbnail image among the displayed one or more thumbnail images, display the thumbnail image to be attached within the first object.

18. The apparatus of claim 17, wherein the second object is for receiving an input for attaching a picture in the UI, wherein the one or more contents are one or more pictures among a plurality of pictures stored in the apparatus, and wherein the one or more thumbnail images are one or more thumbnail images of the one or more pictures.

19. The apparatus of claim 17, wherein the at least one processor is configured to determine the one or more contents among the plurality of contents based on at least one of whether the one or more contents are recently used, whether the one or more contents are recently generated, whether the one or more contents are recently modified, and whether the one or more contents are frequently used.

20. The apparatus of claim 17, wherein the second object is for receiving an input for attaching a contact of a receiver in a message application, wherein the one or more contents are one or more contacts among a plurality of contacts stored in the apparatus, and wherein the one or more thumbnail images are one or more thumbnail images regarding the one or more contacts.

\* \* \* \* \*